United States Patent
Edström et al.

(10) Patent No.: US 12,540,741 B2
(45) Date of Patent: Feb. 3, 2026

(54) DEVICE FOR CONTINUOUS AND EFFICIENT WATER ABSORPTION AND REGENERATION OF DESICCANT, AN AIR COOLER, AND A METHOD FOR CONTROLLING SUCH A DEVICE

(71) Applicant: DRUPPS GROUP AB, Uppsala (SE)

(72) Inventors: Fredrik Edström, Uppsala (SE); Per Dahlbäck, Vänge (SE); Jonas Wamstad, Uppsala (SE)

(73) Assignee: DRUPPS GROUP AB, Uppsala (SE)

( * ) Notice: Subject to any disclaimer, the term of this patent is extended or adjusted under 35 U.S.C. 154(b) by 831 days.

(21) Appl. No.: 17/427,469

(22) PCT Filed: Feb. 5, 2020

(86) PCT No.: PCT/SE2020/050107
§ 371 (c)(1),
(2) Date: Jul. 30, 2021

(87) PCT Pub. No.: WO2020/162820
PCT Pub. Date: Aug. 13, 2020

(65) Prior Publication Data
US 2022/0136715 A1    May 5, 2022

(30) Foreign Application Priority Data
Feb. 5, 2019    (SE) .................... 1950133-7

(51) Int. Cl.
*F24F 3/14*      (2006.01)
*B01D 53/14*    (2006.01)
*B01D 53/26*    (2006.01)

(52) U.S. Cl.
CPC ........ *F24F 3/1417* (2013.01); *B01D 53/1412* (2013.01); *B01D 53/1425* (2013.01);
(Continued)

(58) Field of Classification Search
CPC ............... F24F 3/1417; B01D 53/1412; B01D 53/1425
See application file for complete search history.

(56) References Cited

U.S. PATENT DOCUMENTS

| | | |
|---|---|---|
| 3,750,369 A | 8/1973 | Friedland |
| 4,979,965 A | 12/1990 | Sannholm |

(Continued)

FOREIGN PATENT DOCUMENTS

| | | |
|---|---|---|
| JP | 2011/092815 | 5/2011 |
| WO | WO 2015036614 A1 | 3/2015 |

(Continued)

OTHER PUBLICATIONS

R. Namvar, et al., +Transient characteristics of a liquid-to-air membrane energy exchanger (LAMEE) experimental data with correlations, Int. J. Heat Mass Transf., 55 (23-24) (2012), pp. 6682-6694 (Year: 2012).*

(Continued)

*Primary Examiner* — Schyler S Sanks
(74) *Attorney, Agent, or Firm* — Quarles & Brady LLP

(57) ABSTRACT

The present invention relates to a device for absorbing water using a liquid desiccant and the regeneration of said liquid desiccant by evaporating the absorbed water. The device may further be used in an air cooler. The invention also relates to a method for controlling a device for absorbing water.

15 Claims, 18 Drawing Sheets

(52) U.S. Cl.
CPC ...... *B01D 53/263* (2013.01); *B01D 2251/306* (2013.01); *B01D 2251/402* (2013.01); *B01D 2251/60* (2013.01); *B01D 2251/80* (2013.01); *B01D 2259/4508* (2013.01); *F24F 2003/1458* (2013.01); *F24F 2203/021* (2013.01)

(56) References Cited

U.S. PATENT DOCUMENTS

| | | | |
|---|---|---|---|
| 5,129,925 A | | 7/1992 | Marsala et al. |
| 6,156,102 A | | 12/2000 | Conrad |
| 2006/0130654 A1 | * | 6/2006 | King .................... B01D 5/0045 95/231 |
| 2009/0095162 A1 | | 4/2009 | Hargis et al. |
| 2011/0041537 A1 | | 2/2011 | Pun |
| 2013/0158305 A1 | | 6/2013 | Takahashi |
| 2014/0245769 A1 | * | 9/2014 | Vandermeulen ...... F24F 3/1417 62/238.3 |
| 2019/0331353 A1 | * | 10/2019 | Edström ............ B01D 53/1425 |
| 2022/0136715 A1 | | 5/2022 | Edström et al. |

FOREIGN PATENT DOCUMENTS

| | | | | |
|---|---|---|---|---|
| WO | WO-2018009125 A1 | * | 1/2018 | ......... B01D 53/1425 |
| WO | WO 2018191805 A1 | | 10/2018 | |
| WO | WO 2018191806 A1 | | 10/2018 | |
| WO | WO 2018191807 A1 | | 10/2018 | |

OTHER PUBLICATIONS

International Search Report and Written Opinion, International Application No. PCT/SE2020/050107, dated Jun. 26, 2020, 19 pages.

First Office Action issued in India Jan. 30, 2023. India application IN Application No. 202117038714.

Singapore Search Report, Application No. 11202107466V, Intellectual Property Office of Singapore, dated Aug. 29, 2022, 3 pages.

* cited by examiner

DEVICE FOR CONTINUOUS AND EFFICIENT WATER ABSORPTION AND REGENERATION OF DESICCANT, AN AIR COOLER, AND A METHOD FOR CONTROLLING SUCH A DEVICE

CROSS REFERENCE TO RELATED APPLICATIONS

This application is a 35 U.S.C. § 371 national phase application of PCT/SE2020/050107 (WO-2020/162820 A1), filed on Feb. 5, 2020, entitled "Device for Continuous and Efficient Water Absorption and Regeneratation of Desiccant, an Air Cooler, and a Method for Controlling Such a Device," which claims the benefit of SE Patent Application No. 1950133-7, filed Feb. 5, 2019, each of which are incorporated herein by reference in their entirety.

FIELD OF THE INVENTION

The present invention relates to a device for absorbing water from a gas and a method of absorbing water from gas where the process is a continuous process where a liquid desiccant is regenerated using a system that recovers the heat of vaporization. The device may be used in a humidifier to prepare cool and humidified air.

BACKGROUND

There are many ways of extracting water from air but many of them are struggling with efficiency.

By using a liquid desiccant the vapor or water in the air may be absorbed and stored in the desiccant. The amount of water that may be stored in a liquid desiccant depends on the desiccants ability to absorb water vapor at different humidity. In order to use the same desiccant to absorb new vapor the desiccant needs to be regenerated. When the liquid desiccant is heated the vapor pressure in the desiccant increases. When the vapor pressure in the liquid desiccant becomes higher than the surrounding vapor pressure the absorbed water is vaporised. In this way liquid desiccant may be regenerated and reused. The amount of water, m, that may be absorbed/desorbed per second can be described by:

$$\frac{dm}{dt} = kA(P_m - P_a) \text{ where } \frac{dm}{dt} \quad (1)$$

is the amount of water absorbed/desorbed per second, k is a material constant, A is the area of the liquid desiccant and the air, and $P_m$, is the vapor pressure in the liquid desiccant and $P_a$ is the vapor pressure in the gas surrounding the liquid desiccant.

Several methods for dehumidify air using a vapor compression system have been invented. WO2011/062554 discloses a device for absorbing water or moisture from air using water absorbing material. The water is removed from said material by heating the material evaporating the water and letting the formed steam condensate on the walls of the device.

US5,351,497 discloses the use of a liquid desiccant in an air conditioner where the gas is treated with a liquid desiccant and being cooled at the same time. The liquid desiccant may be regenerated by heating the liquid desiccant in order to remove water.

The present inventors disclose in WO2018/009125 a device that absorbs moisture from air using a liquid desiccant which may be regenerated. The regeneration is achieved by heating the desiccant to evaporate the water which is then compressed and condensed in a heat exchanger. To lower the temperature of the regenerated liquid desiccant and for the device to be more energy efficient the regenerated liquid desiccant is heat exchanged with used liquid desiccant about to be regenerated.

US22060130654 teaches a method and a device for separating water from air using a hygroscopic liquid and teaches also how to remove absorbed water from the obtained water rich liquid by heating. Both devices teaches a system where the heated concentrated liquid desiccant is heat exchanged with liquid desiccant about to be regenerated.

A problem when heat exchanging a liquid desiccant is that the risk of precipitation within the heat exchanger may lead to failure of the device. A way of avoiding such precipitation is to lower the concentration of the salt in the desiccant but then the amount of moisture uptake is significantly reduced as well as the efficiency of the device.

Sorption cooling technique today suffers from the large need of water in order to cool air. This is very limiting especially in regions where water is a scarcity.

WO2018/191807 discloses a system for conditioning air for enclosed spaces using a flowing desiccant and an air membrane exchanger membrane (LAMEE). The system encompasses a regenerator for regeneration of the desiccant which may be mixed with the diluted desiccator.

Prior art systems are not energy and cost efficient enough for absorbing and producing water from air, especially not in less humid conditions. Additionally, there is a need for a system designed to be adapted to the surrounding conditions such ambient temperature and ambient relative humidity (RH).

SUMMARY OF THE INVENTION

The object of the present invention is to provide a device which overcomes the drawbacks of prior art. The present invention solves the problem of allowing an efficient water absorption and regeneration of liquid desiccant without jeopardizing the function of the device by more or less eliminating the risk for precipitation of salts. By allowing higher concentrations, near the saturation point, of the salt in the liquid desiccant the present invention becomes much more efficient than prior art especially in environments having a relative humidity (RH) of 50 or lower. Furthermore the present invention is configured to be as energy efficient as possible by optimizing the energy demanding step of regenerating the liquid desiccant.

In a first aspect the present invention relates to a device for absorbing water from a gas as defined in claim 1.

In a second aspect the present invention relates to an air cooler comprising the device according to the present invention further comprising a humidifier comprising a second housing operatively connected to the water absorption section for receiving air having means for dispensing water and optionally means for increasing the contact time and contact area between the gas and the water.

In a third aspect the present invention relates to a method of absorbing water or producing water from a gas such as air wherein the method comprises:
detecting a concentration of liquid desiccant,
transporting liquid desiccant to a liquid desiccant regenerating section when the detected concentration is at a predetermined value or below a predetermined value, said liquid desiccant having a first temperature, performing a regeneration for removing water from the liquid desiccant, the regeneration taking place in the liquid desiccant regenerating section at a second temperature and at a first pressure, wherein a first energy amount is used to set and maintain the first pressure during regeneration, transporting regenerated liquid desiccant from the liquid desiccant regenerating section for use in absorbing water, the regenerated liquid desiccant having a third temperature, wherein the first pressure is selected so that the first energy amount is at or below a maximum energy or predetermined maximum energy and so that a concentration of the regenerated liquid desiccant is a desired concentration and/or a difference between the third temperature and the first temperature is minimized.

In a fourth aspect the present invention relates to device for absorbing water comprising:

at least one water absorption section for absorbing water from a gas flow using a liquid desiccant, wherein the water absorption section is operatively connected to at least one liquid desiccant container for delivery of liquid desiccant to and from the water absorption section, wherein the at least one liquid desiccant container is further operatively connected to a liquid desiccant regenerating section for delivery of liquid desiccant to and from the at least one liquid desiccant container, wherein the liquid desiccant regenerating section comprises at least one boiler comprising a container, a vacuum system operatively connected to the boiler for reducing the pressure in the container, and wherein the device further comprises a control unit configured to obtain a concentration value of liquid desiccant and to be operatively connected to the vacuum system for controlling the vacuum system to reduce the pressure in the container to a first pressure during regeneration of liquid desiccant.

Thereby, absorption of water can be performed in an energy efficient way and by selecting the concentration or water activity of liquid desiccant, operation of the device for absorbing water can be controlled depending on what is suitable for each application of the present invention. The inventive method thus allows for a more cost and energy efficient operation of the device compared with prior art devices.

The energy consumption of the device can be kept below a maximum value by selecting the first pressure in such a way that the regeneration can be performed without using more than the maximum energy. In most applications this will involve selecting the first pressure to be as low as possible without requiring more than the maximum energy, since this will also minimize the temperature difference.

Suitably, the regeneration is performed by bringing the liquid desiccant to a boiling temperature for releasing water from the liquid desiccant in the form of steam, and the second temperature is the boiling temperature. Thereby, water can be released in a reliable way and since the boiling temperature can be altered by adjusting the pressure, increased control over both the release of water and of the energy requirements for the regeneration is achieved.

Also, the boiling temperature is preferably controlled by adjusting the first pressure in the liquid desiccant regenerating section. Thereby, the liquid desiccant can be brought to boil at a temperature given by the first pressure, where preferably the second temperature is kept low to minimize the temperature difference between the liquid desiccant after regeneration and the liquid desiccant before regeneration. At the same time, the first pressure is advantageously selected so that the energy consumption is kept sufficiently low to optimize the total energy consumption and increase cost efficiency of the device.

Suitably, the third temperature is equal to the second temperature. This is achieved by avoiding additional temperature increases after release of water from the liquid desiccant, and has the advantage that the temperature difference between the liquid desiccant after regeneration and the liquid desiccant before regeneration is further minimized.

Suitably, the predetermined value for the concentration of liquid desiccant is at least 33%, or at least 34%, or at least 35%. Thereby, the concentration can be selected as a concentration of salt in the liquid desiccant where regeneration should be performed in order to maintain an efficiency of the absorption of water. The concentration is suitably chosen depending on factors such as flow in the device and an ambient humidity and/or ambient temperature.

Preferably, the method further comprises cooling the regenerated liquid desiccant to the first temperature. Thereby, by adding a separate cooling step after regeneration has taken place, the temperature difference can be made very small or even zero in order to further increase efficiency of the device when operating to absorb water.

Suitably, the method also comprises detecting an ambient temperature and cooling the regenerated liquid desiccant to the ambient temperature or lower. Thereby, operation of the device can be further improved and a heating of the liquid desiccant that generally takes place during the absorption of water can be counteracted so that the absorption is further improved.

Preferably, the liquid desiccant that is transported to the liquid desiccant regenerating section for regeneration is less than 0.25 of a total amount of liquid desiccant in the device for absorbing water, preferably less than 0.1 of the total amount and more preferably less than 0.05 of the total amount. Thereby, regeneration of a smaller amount can take place during normal operation of the device, avoiding operation interruptions for the purpose of regeneration while simultaneously improving the absorption by regenerating the liquid desiccant.

Suitably, the regenerated liquid desiccant is mixed with further liquid desiccant that is not regenerated and used for absorbing water from a gas in the absorption section of the device. Thereby, the concentration of liquid desiccant is changed more slowly allowing the operation of the device to be performed at desired operating conditions that are not significantly altered by a simultaneous regeneration taking place. Also, the flow of liquid desiccant to be regenerated can be kept small so that the energy required for the regeneration is also small.

Preferably, the concentration or conductivity is determined at predetermined intervals and further liquid desiccant is transported to the regeneration section for regeneration as long as the concentration is below the predetermined value. Thereby, the regeneration can be commenced as soon as the concentration of liquid desiccant is at the predetermined value, and the regeneration can be continued until sufficient amounts of liquid desiccant have been regenerated so that a concentration in a total available amount of liquid desiccant is once again above the predetermined value.

Suitably, the transporting of liquid desiccant to and from the regeneration section is performed at at least one condition for minimizing precipitation of the salt, said condition preferably being a pressure above a second pressure or a temperature above a fourth temperature. Thereby, precipitation of the salt can be avoided and conduits of the device kept clean so that operation is not hindered or decreased due to precipitation that is transported in the liquid desiccant or becomes attached to internal walls and the like.

Suitably, the desired or predetermined desired concentration of the regenerated liquid desiccant is an optimal concentration at which a concentration of the regenerated liquid desiccant mixed with liquid desiccant in a liquid desiccant collecting container or mixed with liquid desiccant to be dispensed is at or above the predetermined value. Thereby, regeneration of a smaller amount of liquid desiccant will serve to bring the concentration of a larger amount of liquid desiccant in the collecting container to the predetermined value so that no further regeneration is necessary.

The desired concentration may be preset but could advantageously instead be determined based on at least one parameter such as an ambient temperature and an ambient humidity. Thereby, the device can operate in an efficient way since the concentration of liquid desiccant during absorption of water can be maintained at a level suited to the particular application in a given location.

According to a fourth aspect of the invention, a data processing device comprising means for carrying out the method is provided, said data processing device preferably being a control unit of the device for absorbing water. Also provided is a computer program product comprising instructions which, when the program is executed by a computer, cause the computer to carry out the method, as well as a computer-readable storage medium comprising instructions which, when executed by a computer, cause the computer to carry out the method.

Many additional advantages and benefits of the present invention will become readily apparent to the skilled person in view of the detailed description below. The embodiments presented below are applicable to all aspects of the present invention.

DETAILED DESCRIPTION OF THE INVENTION

Figure 1A:
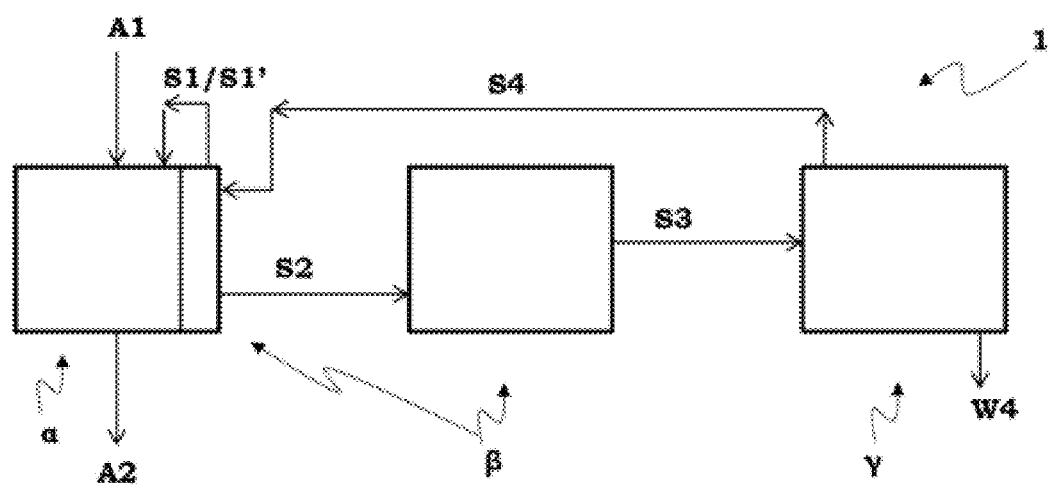
FIG. 1a)-c) schematic views of cross-sections of the present invention. A) discloses an illustration of the three sections water absorption section ($\alpha$), liquid desiccant container ($\beta$) and regenerating liquid desiccant section ($\gamma$), b) shows a cross sectional view of an embodiment of the regenerating section ($\gamma$) and c) shows a cross sectional view of another embodiment of the regenerating section ($\gamma$).

In the present application the wordings "water absorbing material", "water absorption material" and "hygroscopic material" are used interchangeably.

In the present application the wording "optimum temperature range" is a temperature range in which the third temperature T3 (the temperature of the liquid desiccant leaving the liquid desiccant regenerating section $\gamma$) is as low as possible and that the difference between the third temperature T3 and the first temperature T1 (the temperature of the liquid desiccant entering the liquid desiccant regenerating section $\gamma$) is as small as possible while still using less than a maximum energy for regeneration in the device 1. Preferably the optimum temperature range is high enough so that precipitation of the absorbing material in the regenerated liquid desiccant is minimized or avoided when transported to the liquid desiccant container $\beta$.

In the present application the wording "optimal concentration" is a concentration of the absorbing material in the regenerated liquid desiccant S4 so that when the regenerated liquid desiccant is mixed with the liquid desiccant to be dispensed S1 or mixed with the liquid desiccant in the liquid desiccant collecting container $\beta$ (such as the liquid desiccant collecting part 46 or liquid desiccant storage tank 48) the concentration of the regenerated liquid desiccant mixed with the liquid desiccant S2 in the liquid desiccant collecting container at least reaches a predetermined concentration at which regeneration is to be performed. Thus, the optimal concentration is the concentration that makes it unnecessary to perform further regeneration since the concentration of liquid desiccant in the liquid desiccant collecting container is above the predetermined value. This optimal concentration is dependent on the absorption material used and the selected quantity of liquid desiccant transported to the liquid desiccant regenerating section $\gamma$.

In the present application weight % and wt % are used interchangeably.

In the present application the wording "operatively connected" means that a part or section is connected to another part or section via suitable tubings or pipes allowing a flow of liquid or gas from one section or part to the subsequent section or part, or that they are connected in such a way that electric or electronic signals can pass from one part to another.

In the present application the wording "maximum energy" means an energy level at which regeneration of liquid desiccant in an energy efficient and thereby cost efficient way is possible. The maximum energy may be preset or predetermined or the maximum energy may be set based on the energy needed to obtain a first pressure P1 in the container 3 and any energy needed to heat liquid desiccant in said container 3 in order to regenerate liquid desiccant.

The enclosed figures and disclosed embodiments are only examples and are not limiting. Dotted lines in the figures are denoting communication between various parts or sections.

The denotation of the liquid desiccant S1, S1'-S4, gas flow A1-A4 and the water or vapor W1-W4 in the description herein should only be seen as schematic or illustrative and not limiting.

In general S1 denotes the liquid desiccant that is dispensed or to be dispensed, S2 dispensed, collected liquid desiccant or collected dispensed liquid desiccant that has absorbed water and may have been mixed with S4, S1' liquid desiccant that is returned to the means for dispensing liquid desiccant and may be mixed with S4 prior to dispensing, S3 the liquid desiccant entering the liquid desiccant regenerating section γ or the liquid desiccant to be regenerated and S4 the regenerated or concentrated liquid desiccant exiting the liquid desiccant regenerating section γ. In general A1 denotes the gas entering the adsorption section, A2 the gas exiting same section, A3 denotes the gas A2 that has been heated or heat exchanged and A4 denotes the dehumidified gas exiting the humidifier. In general W1 denotes vapor generated during regeneration of liquid desiccant, W2 the water dispensed in the humidifier, W3 is the water exiting the humidifier and W4 is the condensed water exiting the regenerating section.

Any measurement or detection of concentration of a water absorbing material or absorbing material of any liquid is preferably done by measuring or detecting the conductivity of said liquid.

Any measurement or detection of boiling point of any liquid is preferably done by measuring or detecting the specific gravity of said liquid which results in the density and from there the boiling point of the liquid can be calculated.

The present invention relates to water absorption in air using a liquid desiccant. The device according to the present invention may be used for example, but not limited to, for dehumidification of indoor environments or in air-conditioning devices. A lower vapor pressure in the desiccant, i.e. the higher concentration of salt, results in a higher rate of absorption of water vapor. Therefore, it is desirable to have a high concentration of absorbing material or salt in the liquid desiccant to absorb the water vapor in the air. However, there is a limit to how much salt can be dissolved in the liquid desiccant. This limit is temperature dependent where hot water can dissolve more salt.

To avoid formation of salt crystals in an evaporation or cooling process, the concentration can never go above the maximum concentration limit. In an evaporation process, the liquid desiccant is heated to the boiling point where water is evaporated. Prior art have also suggested the use of heat exchangers in order to recover heat and thereby save energy. However, if the salt concentration in the desiccant reaches the maximum allowed concentration during the heat exchange salt crystals will form in the heat exchanger and cause a break down and failure.

The present invention facilitates a higher salt concentration in the liquid desiccant and where the liquid desiccant dispensed has a low temperature leaving a more efficient water absorption process and device. The present invention further provides a device, method and system which allows absorbing water in a highly energy efficient way through an innovative regenerating process.

Device for Water Absorption

The device according to the present invention is designed for water absorption from a gas, for example from air. The device may be integrated into another device or may be a standalone device and the device is suitable for producing water.

Referring now to FIGS. 1a), b) and c). The device 1 according to the present invention comprises at least one water absorption section α which is adapted for absorbing water from a gas A1 using a liquid desiccant S1. The water or moisture uptake process results in gas A2 with reduced moisture and a dispensed liquid desiccant S2 with increased water content. The water absorption section α is operatively connected to at least one liquid desiccant container β for delivery of liquid desiccant to (S1/S1') and from (S2) the water absorption section α. The at least one liquid desiccant container β is further operatively connected to a liquid desiccant regenerating section γ for delivery of liquid desiccant to (S4) and from (S3) the at least one liquid desiccant container β. The liquid desiccant regenerating section γ is also operatively connected with a regenerated liquid desiccant container 21 or the liquid desiccant container β, preferably via a regenerated liquid desiccant container 21, for delivery of liquid desiccant S4.

The liquid desiccant regenerating section γ comprises at least one boiler 2 comprising a container 3 and a vacuum system 18 operatively connected to the container 3 and wherein said section preferably also comprises a regenerated liquid desiccant container 21.

The device preferably further comprises a control unit 19 configured to obtain, determine, detect or measure a concentration value of the water absorbing material in a liquid desiccant and to be operatively connected to the vacuum system 18 for controlling the vacuum system 18 to reduce the pressure in the container 3 to a first pressure during regeneration of liquid desiccant. In a preferred embodiment the control unit 19 is configured to obtain or measure or detect or determine the concentration of the collected liquid desiccant S2 (preferably by measuring the conductivity and temperature) in liquid desiccant container β, preferably also the temperature of the liquid desiccant to be regenerated S3 and preferably also the temperature and humidity (RH) of the surrounding atmosphere (the ambient temperature and relative humidity). Based on the ambient temperature and relative humidity and/or the concentration of the collected dispensed liquid desiccant S2 in liquid desiccant container β the control unit 19 may be configured to set the predetermined value or threshold value, i.e. the concentration at which regeneration of the liquid desiccant should be performed or when, and what quantity of, liquid desiccant in β should be transported to the regeneration section γ. In one embodiment the control unit 19 is configured to obtain or measure or determine the concentration of the liquid desiccant to be dispensed S1 and the concentration of the collected liquid desiccant S2 and is further configured to set the predetermined value or threshold value based on ΔC, i.e. the difference between the concentration of the liquid desiccant to be dispensed S1 and the collected dispensed liquid desiccant S2 in the liquid desiccant container β. Preferably the measurements, calculations or determinations conducted by the control unit 19 is based on what absorption material or salt is used in the liquid desiccant.

The device preferably also contains a heating unit 5. One advantage with a heating unit 5 is that the liquid desiccant can be heated which means that the pressure in the container does not have to be reduced as much which saves energy. The vacuum system 18 is configured to reduce the pressure in the container 3 and the heater 5 is operatively connected to the container 3 or arranged in the container 3 configured to heat the liquid desiccant in the container 3. The preferred regenerated liquid desiccant container 21 is operatively connected to the container 3 for delivery of regenerated liquid desiccant S4 from the container 3 and operatively connected to the liquid desiccant container β, preferably the liquid desiccant collecting part 46, or the means for dispensing the liquid desiccant 66. In one embodiment the boiler 2 comprises a boiler housing comprising the container 3, the heating unit 5 and the vacuum system 18 and preferably the regenerated liquid desiccant container 21. In one embodiment the heating unit 5 is a heat pump or heat pump system 8. In another embodiment the vacuum system and heating unit 5 is a vapor compression system.

The vacuum system 18 and preferably also the heating unit 5 are configured to generate a regenerated liquid desiccant (S4) and is configured to do so in an energy efficient way in regards of the total energy consumption of the device 1.

Configuration in regards of the total energy consumption of the device 1 means that the vacuum system 18 and the heating unit 5 are configured to regenerate liquid desiccant using minimum amount of energy and/or to regenerate liquid desiccant to obtain a predetermined $\Delta C$ or an optimal $\Delta C$. A too low $\Delta C$ would result in a high flow of liquid desiccant through the regeneration section γ which in turn would result in a high energy consumption. A too high $\Delta C$ would result in inadequate water absorption in the water absorption section α. In the latter case, to absorb the same amount of water would then require a higher amount of energy, for example by increased fan or pump 72 activity, and the device would probably not be as efficient in dry environments. The optimal $\Delta C$, at which the device absorbs or produces the maximum amount of water per energy unit, depends on ambient temperature and relative humidity but also on the absorption material or salt used in the liquid desiccant. The configuration may be done according to the method of the present invention. In general, by knowing $\Delta C$ or the predetermined value of concentration of the collected liquid desiccant in the liquid desiccant container β at which regeneration should be performed and a desired concentration of the regenerated liquid desiccant S4 a first pressure P1 in the container 3 generated by the vacuum system 18 may be selected in order to generate regenerated liquid desiccant S4 using a minimum amount of energy i.e. at or below a maximum energy. In one embodiment the temperature of the collected liquid desiccant S2 or the liquid desiccant to be regenerated S3 is preferably also measured, more preferably the ambient temperature and humidity is also measured. This configuration is preferably performed using a control unit 19 configured to obtain or measure or determine the concentration and preferably also the temperature of the collected dispensed liquid desiccant S2, and/or preferably the concentration and preferably also the temperature of the liquid desiccant to be regenerated S3 and preferably also the temperature and humidity (RH) of the surrounding atmosphere. In a preferred embodiment the control unit 19 uses the method according to the present invention. In one embodiment the control unit is further configured to determine an energy amount required for regeneration of the liquid desiccant based at least on the predetermined value of concentration of liquid desiccant, i.e. the concentration when regeneration is to take place and the desired concentration of the regenerated liquid desiccant S4 after regeneration, and wherein the control unit is further configured to select the first pressure so that the energy amount is less than or equal to a maximum energy. In one embodiment the control unit is further configured to determine or select the desired concentration of the regenerated liquid desiccant S4 based on at least one of an ambient temperature and an ambient humidity and the concentration of the collected dispensed liquid desiccant S2. In another embodiment the control unit is configured to select the first pressure to minimize a temperature difference between a third temperature and a first temperature. The minimization of the temperature is done so that the energy amount is still less than or equal to a maximum energy. The present invention facilitates that the concentration of the liquid desiccant to be dispensed S1 at or very close to the saturation point.

The control unit 19 may be arranged in the device 1 to facilitate any communication between different parts or sections of the device 1. The control unit 19 may be one or more units. The control unit 19 may be a computer or a processor with suitable software and may communicate with at least one sensor for detecting parameters such as concentration of liquid desiccant at different parts of the device, temperature of the liquid desiccant, ambient temperature and ambient humidity, among others. The communication between the vacuum system 18 and the heating unit 5 is schematically illustrated in FIGS. 1-3, 5 and 6 with dotted lines and may be facilitated using control unit 19. The control unit 19 is preferably configured to control the vacuum system 18 and the optional heating unit 5 to operate in an energy efficient way by using less than a maximum energy. The control unit 19 may preferably also communicate with the liquid desiccant container β to obtain or determine or detect or measure the temperature and/or concentration of the dispensed liquid desiccant S2. The control unit 19 preferably communicates with container 3 or the optional regenerated liquid desiccant container 21 in order to determine the obtained concentration of the regenerated liquid desiccant. Determinations and/or measurements may be done using suitable sensors in the relevant part or section which communicates with the control unit 19.

Vapor Compression

Evaporation of water is energy demanding and one way of reducing the energy needed is to use vapor compression where the vaporization energy is recovered. Suitable systems are for example mechanical vapor recompression or vacuum vapor compression systems. In one preferred embodiment the boiler 2 comprises a vacuum vapor compression (VVC) system or a mechanical vapor compression system (MVR) where said system comprises a heating unit 5 which heats the liquid desiccant in container 3 using compressed vapor obtained from the liquid desiccant.

Figure 1B:
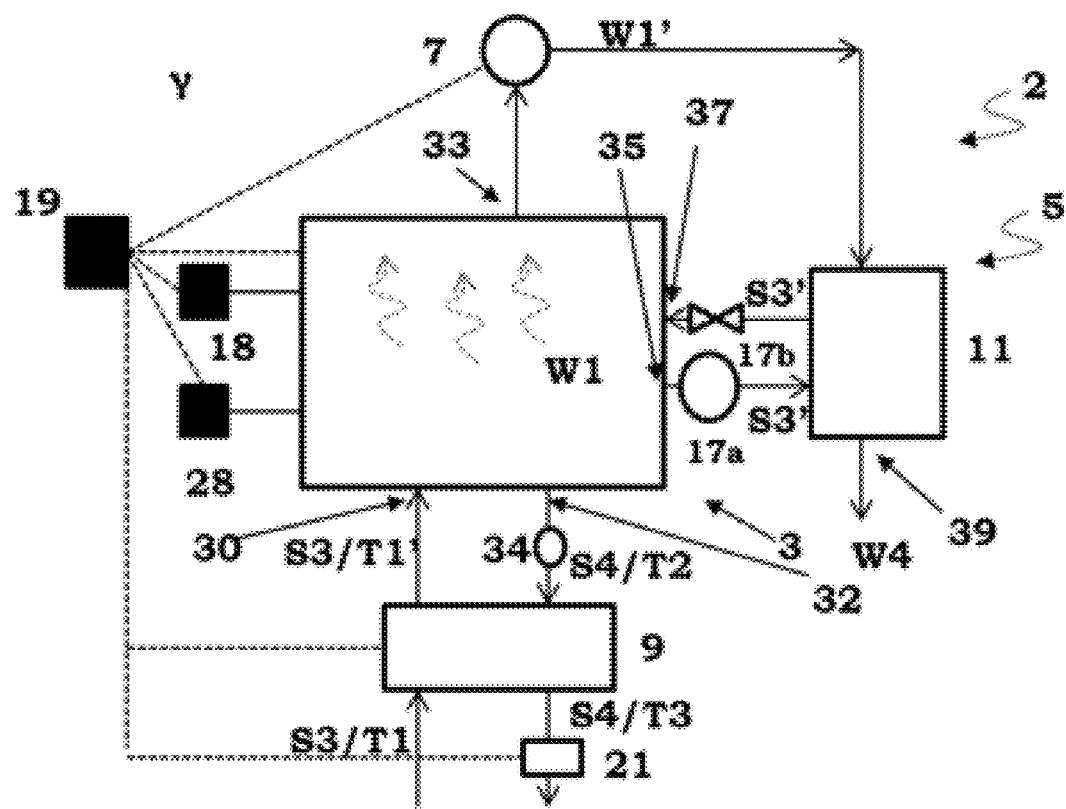

FIG. 1b) discloses a preferred embodiment wherein the boiler 2 comprises a heating unit 5 comprising a compressor 7, a first desiccant heat exchanger 9 and a second desiccant heat exchanger 11, a regulator 17a and/or a valve 17b and an optional heating device 28. The optional heating device 28, in thermal contact with the liquid desiccant in the container 3, may act as a back-up heater if the heating unit 5 fails or during start-ups or just as an additional heater. The regulator 17a regulates the pressure and pumps the liquid desiccant from the container 3 to the second heat exchanger 11 and back to the container 3. The valve 17b controls the flow and/or the pressure in the second desiccant heat exchanger 11. The first desiccant heat exchanger 9 is operatively connected to the at least one liquid desiccant container β for delivery and receiving of liquid desiccant S3 and S4 respectively and further operatively connected to the container 3 for delivery and receiving of liquid desiccant S3 and S4 respectively. The first desiccant heat exchanger 9 is configured to heat exchange liquid desiccant to be regenerated S3 (increasing the temperature from a first temperature T1 to an elevated first temperature T1') with regenerated liquid desiccant S4 (decreasing the temperature from T2 to a third temperature T3). The container 3 is operatively connected to the regulator 17a for delivery of liquid desiccant where the regulator 17a is further operatively connected to the second desiccant heat exchanger 11 for delivery of liquid desiccant S3'. The second desiccant heat exchanger is further operatively connected to the valve 17b which in turn is operatively connected to the container 3 for delivery of liquid desiccant S3'. Container 3 is also operatively connected to the compressor 7 for delivery of vapor to the compressor. Compressor 7 is further operatively connected to the second desiccant heat exchanger 11 for delivery of compressed vapor. The container 3 is preferably operatively connected to a regenerated liquid desiccant container 21 for delivery of regenerated liquid desiccant S4 where the regenerated liquid desiccant container 21 is further operatively connected to the liquid desiccant container β, preferably the liquid desiccant collecting part 46, or the means for dispensing the liquid desiccant 66. The regenerated liquid desiccant container 21 preferably communicates with the control unit 19. When having more than one water absorption section α the regenerated liquid desiccant container 21 makes it easier and more efficient to distribute regenerated liquid desiccant to the different water absorption sections. One advantage of using vapor compression such as vacuum vapor compression (VVC) system or a mechanical vapor compression system (MVR) is that the regeneration is energy efficient and can be optimized based on the absorption material.

The liquid desiccant to be regenerated S3 having the first temperature T1 enters the first desiccant heat exchanger 9 and is heated through heat exchange with regenerated liquid desiccant S4. The liquid desiccant S3 exit the first desiccant heat exchanger 9 having an elevated temperature T1' and enters container 3. In the container the pressure will be reduced using the vacuum system or compressor 7 and heated to a second temperature T2 using heating system 5 and an optional heating device 28. Liquid desiccant is allowed to exit the container and enter the regulator 17a to adjust the pressure of the liquid desiccant prior to enter the second desiccant heat exchanger 11. In the second desiccant heat exchanger the liquid desiccant is heat exchanged with the compressed vapor before re-entering the container 3. Vapor W1 from the liquid desiccant in the container 3 is produced by the heating and the reduced pressure and allowed to exit the container and enter the compressor 7. The vapor is compressed in the compressor leading to a vapor W1' with increased temperature and allowed to enter the second desiccant heat exchanger 11 where the compressed vapor is heat exchanged with the liquid desiccant. The vapor is allowed to condense forming condensation W4 in the heat exchanger. The compressor 7 and the second desiccant heat exchanger allows the condensation energy to be returned to the vaporization process. The compressor 7 is configured to compress the vapor so that the liquid desiccant S3 in the container 3 has a temperature preferably within an optimum temperature range and/or an optimal desiccant concentration range when exiting the container 3. This optimum temperature range and/or optimal desiccant concentration range is at least partly selected so that no or minimal amount of precipitation occurs in the first desiccant heat exchanger and/or during the transport of the regenerated liquid desiccant S4 to the water absorption section α or the liquid desiccant container β. Regenerated liquid desiccant S4 will only have a slightly higher salt concentration than the liquid desiccant to be regenerated S3. In one preferred embodiment the optimum temperature range is selected so that a minimum amount of added heat is needed to form vapor W1 at the pressure P1.

Each container 3 of each boiler 2 comprises inlets and outlets for liquid desiccant to enter and exit the containers 3. The inlets and outlets may be sealable. Preferably the container 3 comprises a first inlet 30, a first outlet 32 and optionally a discharge valve or pump 34. The first inlet 30 is arranged to allow the liquid desiccant to be regenerated S3 delivered from the liquid desiccant container β to enter the container 3. The first outlet 32 of the container is arranged to allow concentrated liquid desiccant S4 to exit the container 3 and to be delivered to the liquid desiccant collecting part 46 or to the means for dispensing the liquid desiccant 66 of the water absorption section α, but preferably the liquid desiccant collecting part 46. The container 3 further comprises a second outlet 33 operatively connected to the compressor 7, a third outlet 35 operatively connected to the regulator 17 and a second inlet 37 operatively connected to the second desiccant heat exchanger for receiving heated liquid desiccant S3'. The boiler 2 or the second desiccant heat exchanger 11 may have a water outlet 39 for withdrawal of condensed water W4. The boiler housing and/or the container 3 may further be thermally insulated in order to minimize energy losses.

Heat Pump

Figure 1C:
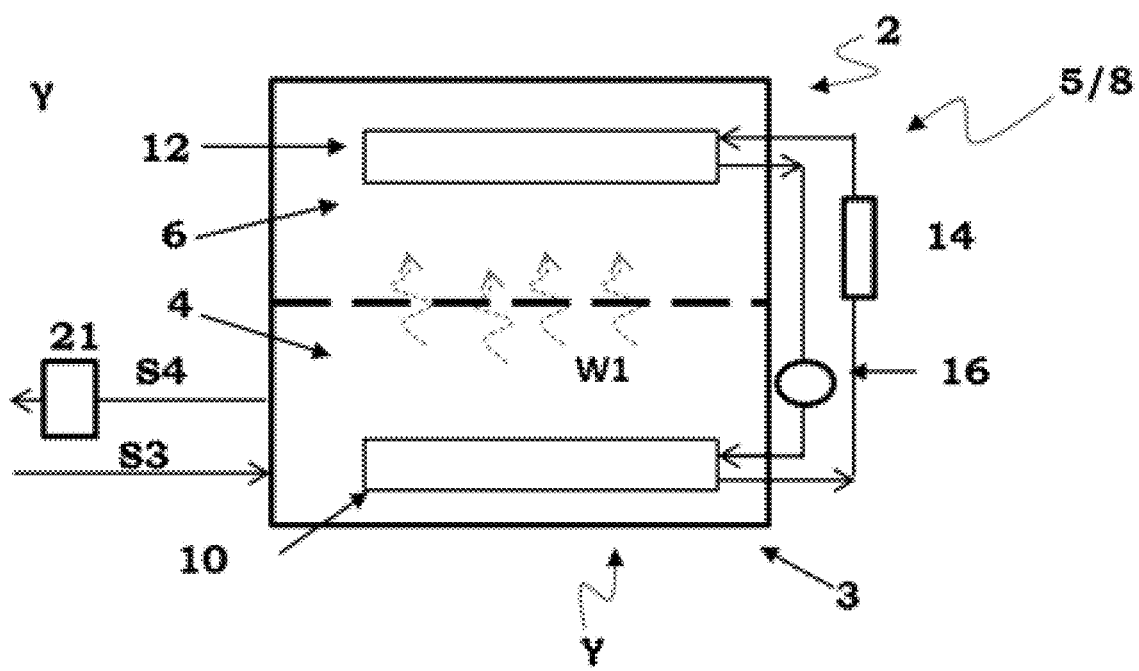
Figure 2A:
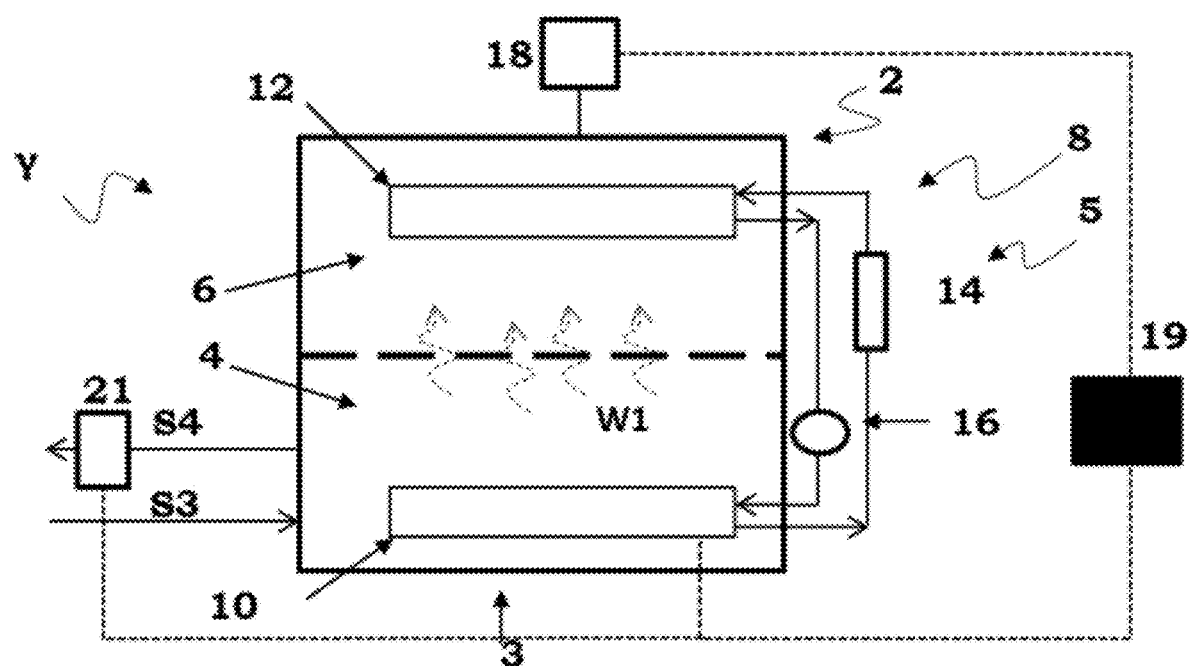
FIG. 2a)-b), schematic views of cross-sections of embodiments of regenerating liquid desiccant section according to the present invention.
Figure 2B:
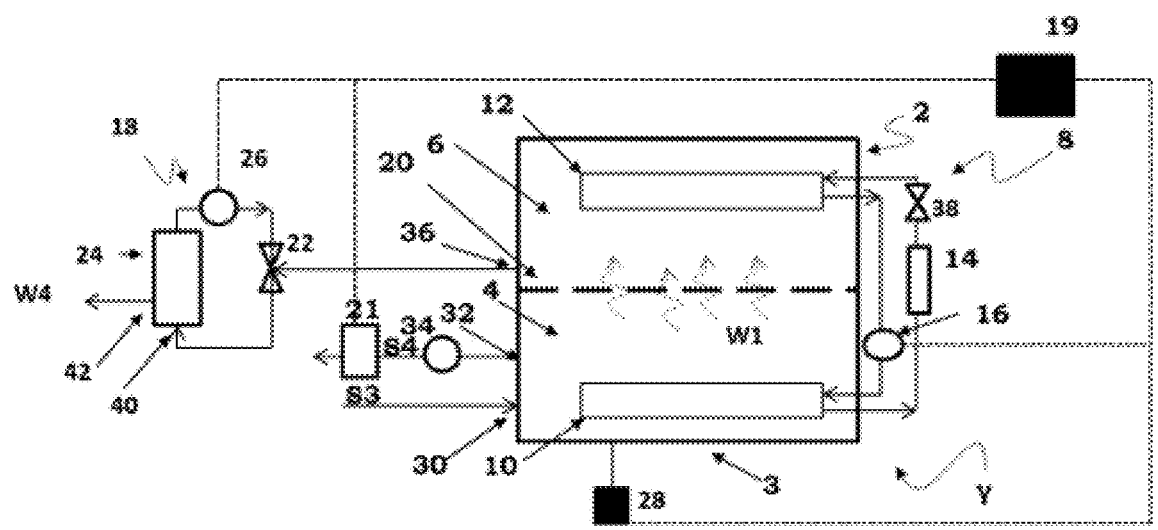

In another preferred embodiment the heating unit 5 is a heat pump or a heat pump system 8. FIG. 1c) discloses another preferred embodiment where the boiler 2 comprises the container 3 having a heating chamber 4 and a condensing chamber 6. The heating chamber and the condensing chambers are operatively connected to each other in such a way that vapor formed during heating of liquid desiccant in the heating chamber 4 may enter the condensing chamber 6. One advantage of using a heat pump or a heat pump system is that it is energy efficient.

In one preferred embodiment the heating unit 5 comprises a heat pump system 8 having a first heat exchanger 10 arranged in the heating chamber 4 and a second heat exchanger 12 arranged in the condensing chamber 6. The first heat exchanger 10 is in thermal contact with liquid desiccant in the heating chamber and the second heat exchanger 12 is in thermal contact with vapor entering the condensing chamber 6 from the heating chamber 4. A cooling device 14 is connected to both the first heat exchanger and the second heat exchanger. The cooling device 14 cools the cooling media (CM) or refrigerant exiting the first heat exchanger 10 prior to entering the second heat exchanger 12. A compressor 16 is operatively connected to the second heat exchanger 12 and the first heat exchanger 10 in order to compress the cooling media or refrigerant exiting the second heat exchanger prior to entering the first heat exchanger. The heat pump system 8 in the boiler 2 is preferably configured to keep the liquid desiccant in the heating chamber 4 within an optimum temperature range and/or at an optimal concentration when exiting the boiler 3. The container 3 is preferably operatively connected to a regenerated liquid desiccant container 21 for delivery of regenerated liquid desiccant S4 where the regenerated liquid desiccant container 21 is further operatively connected to the liquid desiccant container β, preferably the liquid desiccant collecting part 46, or the means for dispensing the liquid desiccant 66. The regenerated liquid desiccant container 21 preferably communicates with the control unit 19. When having more than one water absorption section α the regenerated liquid desiccant container 21 makes it easier and more efficient to distribute regenerated liquid desiccant to the different water absorption sections. In one preferred embodiment the optimum temperature range is selected so that a minimum amount of added heat is needed to form vapor W1 at the pressure P1. Preferably the cooling device 14 and the compressor 16 are arranged on the outside of the container 3 of the boiler 2.

In one embodiment the vacuum system 18 comprises an ejector or valve 22 operatively connected to the condensed water collector 20 and further connected to a water storage tank 24. The water storage tank 24 is also operatively connected to a vacuum pump 26 which is further operatively connected to the ejector or valve 22. This facilitates an efficient and easy way of collecting the condensed water.

An optional heating device 28 may be arranged in the heating chamber 4 in the boiler. The heating device is in thermal contact with the liquid desiccant to heat the liquid desiccant. The optional heating device 28 may act as a back-up heater if the heat pump system 8 fails or during start-ups or just as an additional heater.

By using a heat pump system as a heating device to heat the liquid desiccant in the heating chamber 4 the process can be even more optimized by selecting a cooling media that is well suited for the regenerating parameters (temperature and pressure) for the specific liquid desiccant.

A condensed water collector 20 may be arranged in the container 3, preferably in the condensing chamber 6, for collecting the condensed water when the vapor W1 is condensed when brought into contact with the second heat exchanger 12.

The first heat exchanger 10 in the heating chamber 4 is in thermal contact with the liquid desiccant configured to heat the liquid desiccant to produce vapor W1 and the second heat exchanger 12 is arranged in the condensing chamber 6 configured to condensate the produced vapor W1 that has entered or enter the condensing chamber. The cooling device 14 and the compressor 16 are arranged between the first and the second heat exchanger configured to cool the cooling media exiting the first heat exchange 10 and to heat the cooling media exiting the second heat exchanger 12. An expansion valve 38 may be arranged in the heat pump system. The expansion valve 38 may be operatively connected to the cooling device 14 and also to the second heat exchanger, or it may be operatively connected to the cooling device 14 and also to the first heat exchanger 10. The expansion valve 38 is preferably arranged downstream of the cooling device 14. Suitable cooling media (CM) or refrigerant in the heat pump system 8 may be hydrofluoro carbons or mixtures thereof. Non-limiting examples of suitable cooling media are R407C, R134A and HFO-1234z. In one embodiment the cooling device 14, the compressor 16 and the expansion valve 38 are all arranged outside of the container 3.

The device 1 is then also configured to allow the collected water exiting the second outlet 36 of the container 3 to enter the water storage tank 24 via a first inlet 40. The vacuum system 18 should preferably reduce the pressure in the container 3 of the boiler 2 as much as possible in order to limit the temperature difference between the liquid desiccant S3 exiting the liquid desiccant collecting part β and the regenerated liquid desiccant S4 exiting the regenerating section γ. This significantly reduces the amount of energy needed to heat the liquid desiccant in the boiler.

Referring now to FIGS. 1*b*) and 2*a*)-*b*). Each container 3 of each boiler 2 comprises inlets and outlets for liquid desiccant to enter and exit the containers 3. The inlets and outlets may be sealable. Preferably the container 3 comprises a first inlet 30, a first outlet 32 and optionally a discharge valve or pump 34 operatively connected to the first outlet 32 or the first desiccant heat exchanger 9 for transporting regenerated liquid desiccant S4 to the liquid desiccant container β. The first inlet 30 is arranged to allow the liquid desiccant to be regenerated S3 delivered from the liquid desiccant container β to enter the container or the heating chamber 4 of the container 3. The first outlet 32 of the container is arranged to allow concentrated liquid desiccant S4 to exit the container 3 or the heating chamber and to be delivered to the liquid desiccant collecting part 46 or to the means for dispensing the liquid desiccant 66 of the water absorption section α, but preferably the liquid desiccant collecting part 46. The container 3 may also have a second outlet 36 for withdrawal of condensed water collected using second desiccant heat exchanger 11 or the condensed water collector 20. Boiler 2 and/or the container 3 may further be thermally insulated in order to minimize energy losses.

The device is thereby configured to allow the liquid desiccant to be regenerated S3 exiting the liquid desiccant collecting container β to enter the boiler 2 and the container 3 via first inlet 30. The liquid desiccant is allowed to be heated in the container 3 of the boiler 2 by the heating unit 5 to generate vapor W1 leaving a more concentrated liquid desiccant S4. The concentrated or regenerated liquid desiccant S4 is allowed to exit the container 3 via first outlet 32 optionally via the discharge valve or pump 34. The concentrated or regenerated liquid desiccant S4 is then returned to the means for dispensing liquid desiccant 66 or to the liquid desiccant collecting container β such as the liquid desiccant collecting part 46 or to the means for dispensing the liquid desiccant 66 of the water absorption section α, preferably via regenerated liquid desiccant container 21. Vapor W1 generated during the heating of the liquid desiccant in the container 3 is allowed to condense and is collected.

The temperature of the liquid desiccant in the container 3 should be high enough to evaporate some of the water in the liquid desiccant. Since the pressure in the container 3 is reduced the evaporation or boiling temperature is reduced. The evaporation temperature is also dependent on the salt used and the concentration of the salt in the liquid desiccant since salts increase said boiling temperature. In one preferred embodiment the temperature is the boiling temperature of the liquid desiccant at the first pressure in the boiler. In one preferred embodiment the optimum temperature of the liquid desiccant in the boiler or in the heating chamber is 30 to 125° C. more preferably 70-115° C., or more preferably 75-110° C. This would minimize the temperature difference between T3 and T1. Small temperature differences will also result in no or only a small temperature increase of the liquid desiccant in the liquid desiccant collecting container β. In another preferred embodiment the optimum temperature is 90° C. or lower, or 70° C. or lower, or 60° C. or lower but 30° C. or higher, or 40° C. or higher. In a specifically preferred embodiment when the liquid desiccant is or comprises magnesium chloride the temperature is 30-60° C. more preferably 40-50° C. The pressure in the container 3 is preferably 10-300 mbar. In one embodiment when a heat pump is used the pressure in the container 3 is 30-100 mbar, preferably 45-50 mbar. In one embodiment when vapor compression is used the pressure is preferably 100-300 mbar more preferably around 200 mbar. The temperature of the liquid desiccant and the pressure in the container 3 should be optimized so that the device 1 is energy efficient. The pressure should preferably be low enough so that the liquid desiccant S3 that enters the container 3 should have to be heated as little as possible in order to evaporate water from said desiccant. The difference between the first temperature T1 and the third temperature T3 should be as small as possible, preferably 5° C. or less, or 3° C. or less, or 1° C. or less. Also the difference in concentration between S3 and S4 should preferably small.

The vacuum system 18 and the heating unit 5 are configured to generate a concentration, preferably an optimal concentration, of a regenerated liquid desiccant and the first pressure P1 is preferably selected so that the temperature difference between T3 and T1 is also as small as possible. The vacuum system 18 and the heating unit 5 are preferably configured to evaporate just enough water so that the predetermined value of concentration is reached or exceeded when the regenerated liquid desiccant is mixed with the liquid desiccant in the liquid desiccant container β. The optimal concentration is preferably 1-30 weight % higher than the concentration of the liquid desiccant before the regeneration step. In one preferred embodiment the optimal concentration is 3-25 weight % higher. It is preferable to only remove sufficient amount of water in order to reach the predetermined value of concentration. A continuous removal would cost too much energy since the boiling point for the liquid desiccant increases with increasing concentration.

Any water generated in the regenerating section γ may exit through water outlet 39 or 42. Water outlet 42 may be the second outlet 36 of the container 3 or it may be arranged in the water storage tank 24. The water W4 exiting the regenerating section γ may be collected, optionally further purified and used as drinking water or used for cooling and moisturizing air in the air cooler according to the present invention.

Figures 4A, 4B:
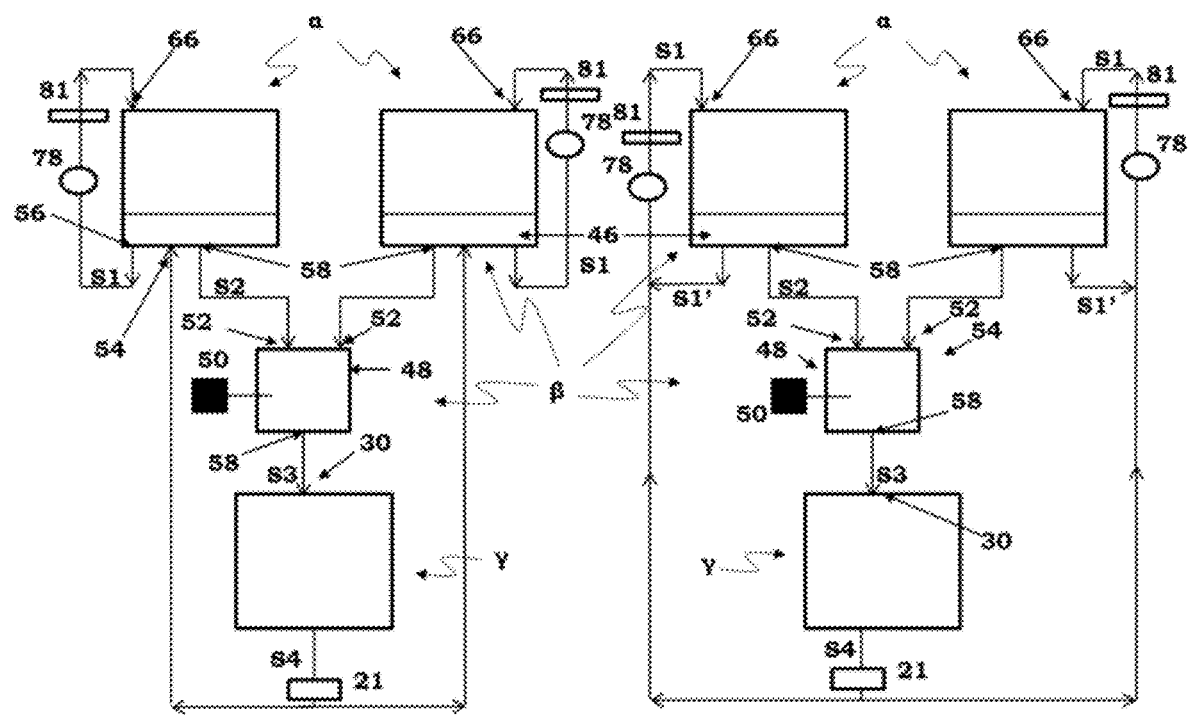
FIG. 4a)-b), schematic views of a cross-sections of an embodiment of the present invention with two water absorption sections ($\alpha$) per each regenerating section ($\gamma$).

Referring now to FIGS. 4a) and b). The liquid desiccant container β may be a liquid desiccant collecting part 46 arranged as a part of the water absorption section α and/or as a liquid desiccant storage tank 48 separated from the water adsorption section α. In one embodiment the liquid desiccant container β comprises a liquid desiccant collecting part 46 operatively connected to the water absorption section α and also operatively connected to a liquid desiccant storage tank 48, for delivery of liquid desiccant to and from the water absorption section α and for delivery of liquid desiccant to the liquid desiccant storage tank 48. The liquid desiccant collecting part 46 is preferably also operatively connected to the liquid desiccant regenerating section for delivery of regenerated liquid desiccant S4. The liquid desiccant collecting part 46 may be arranged at the bottom of the first housing 60 of the water absorption section α.

Referring now to FIGS. 4a) and b). Dispensed liquid desiccant S2 that has absorbed water from the gas in the water absorption section α enters the liquid desiccant container β such as the liquid desiccant collecting part 46 or the liquid desiccant storage tank 48 for example via a first inlet 52. Regenerated liquid desiccant S4 may enter the liquid desiccant collecting part 46. The device is configured to heat the liquid desiccant in the liquid desiccant collecting part 46 or the liquid desiccant storage tank 48 using the heater 50. Liquid desiccant container β is operatively connected to the water absorption section α and the means for dispensing the liquid desiccant. Liquid desiccant to be dispensed S1/S1' to be transported to the water absorption section α may exit the liquid desiccant container β via a first outlet 56. Liquid desiccant S3 to be transported to the regenerating section γ may exit the liquid desiccant container β via a second outlet 58. A sensor may be arranged in the liquid desiccant container β and adapted to determine the water content in the desiccant. The sensor is preferably communicating with the control unit 19 to efficiently control the temperature and concentration of the liquid desiccant.

Figure 3A:
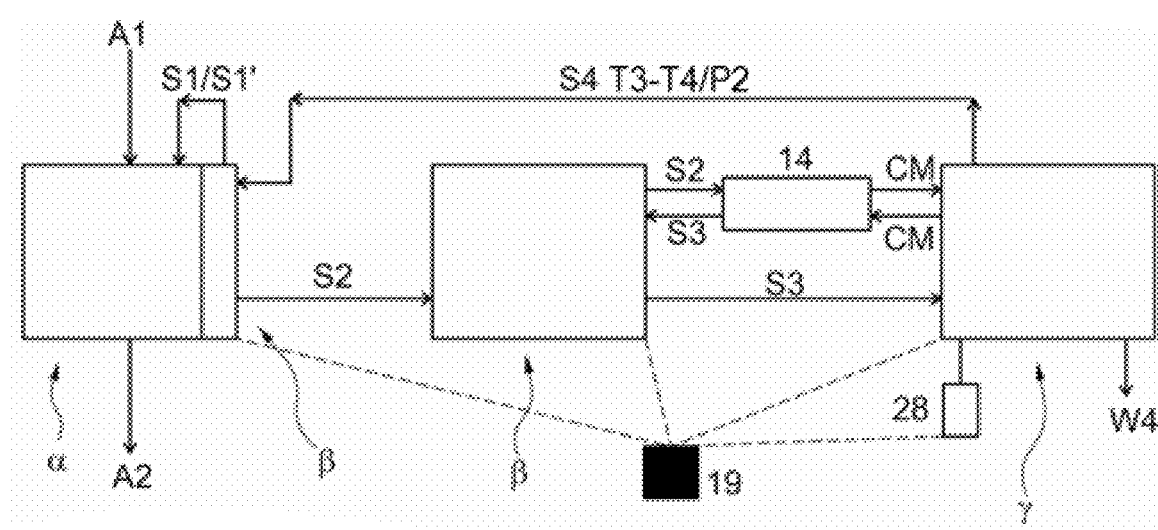
FIG. 3a)-b), a schematic view of a cross-section of an embodiment of the present invention where the liquid desiccant in the storage tank is heat exchanged with the cooling media in the heat pump.
Figure 3B:
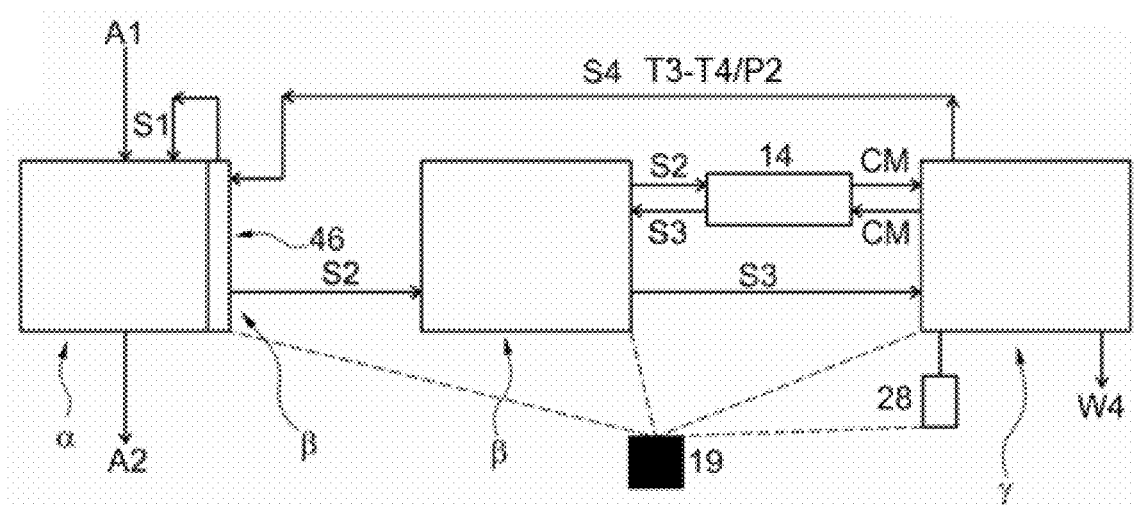

The heater 50 may be any suitable heater such as an electric heater, district heating, solar heating or any suitable thermal heater. In one embodiment the heater 50 is a heat exchanger. When the heater 50 is a heat exchanger the liquid desiccant in the container β may be heat exchanged with the cooling media or refrigerant in the cooling device 14 of the heat pump system 8. The latter is schematically illustrated in FIGS. 3a) and b). The heater 50 and the cooling device 14 may be a heat exchanger such as a plate heat exchanger. By having a liquid desiccant storage tank 48, which may be operatively connected to two or more liquid desiccant collecting parts 46, a constant supply of liquid desiccant is facilitated, and furthermore, by heat exchanging the liquid desiccant in the container β with the cooling media in the heat pump system 8 the device 1 becomes more energy efficient. The liquid desiccant container β may be operatively connected to a pump 78 and a filter 81 wherein the filter is operatively connected to the water absorption section α. The filter 81 removes particles and other unwanted impurities. In one embodiment the liquid desiccant container β comprises a liquid desiccant collecting part 46 which is operatively connected to the pump 78 which in turn is operatively connected to the filter 81. The filter is then operatively connected to the at least one means for dispensing a liquid desiccant 66 and wherein a pump 78 facilitates the transport of liquid desiccant.

In a preferred embodiment the device 1 contains two or more water absorption sections α per each liquid desiccant container β for example three or more, or four or more, or five or more. By having two or more water absorption sections the device 1 becomes more energy efficient and allows a more continuous absorbing and regeneration process. In another preferred embodiment the device 1 contains two or more water absorption sections α per each liquid desiccant regenerating sections γ for example three or more, or four or more, or five or more. This makes the device more efficient since the flow to and from the regenerating section γ is usually much lower than the recirculating flow of S1/S1'. Preferably when the device 1 comprises two or more liquid desiccant container β and/or two or more liquid desiccant regenerating sections γ the device further comprises at least one regenerated liquid desiccant container 21 operatively connected to each liquid desiccant regenerating section γ. Said regenerated liquid desiccant container 21 is preferably operatively connected to each water absorption section α for delivery of regenerated liquid desiccant S4. In a preferred embodiment the device is configured to mix the regenerated liquid desiccant S4 with liquid desiccant to be dispensed S1/S1' upstream of the means for dispensing a liquid desiccant 66.

Figure 5A:
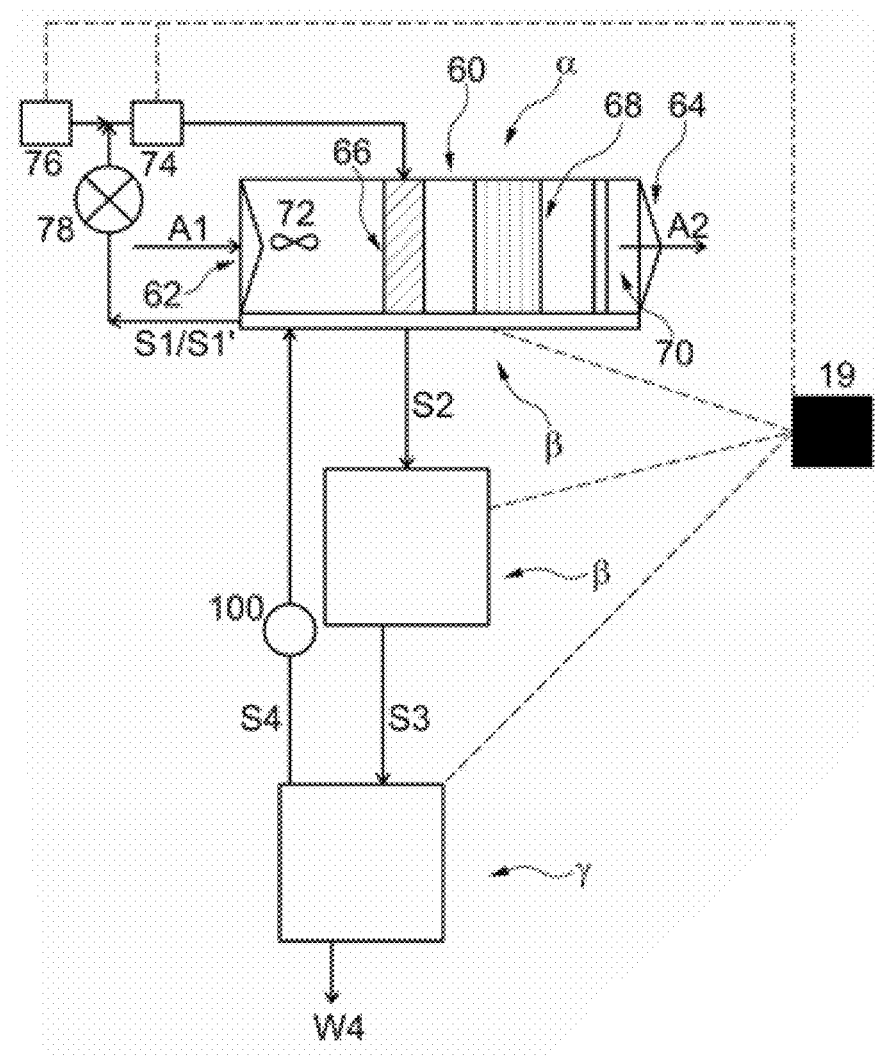
FIG. 5, a) schematic views of cross-sections of an embodiment of the present invention with the three sections for water absorption ($\alpha$), liquid desiccant container ($\beta$), regenerating liquid desiccant ($\gamma$) and sorption cooling ($\lambda$), b) a schematic cross-sectional view from above of an embodiment of the water absorption section ($\alpha$) with cooling pads or evaporation pads, c) a schematic cross-sectional view from above of an embodiment of the water absorption section ($\alpha$) and d) a schematic cross-sectional view from above of an embodiment of the water absorption section ($\alpha$) with a single pad.

Referring now to FIG. 5a). The device 1 according to the present invention comprises a water absorption section α, a liquid desiccant container β and a liquid desiccant regenerating section γ where a gas is dried in the water absorption section α using a liquid desiccant which is collected in the liquid desiccant container β and regenerated in the regenerating section γ and then returned to the water absorption section α via the liquid desiccant container β. The water absorption section α comprises a first housing 60 with a first gas inlet 62 and a first gas outlet 64 and where said inlet and outlet may both be sealable using any suitable means to close or seal said inlet and outlet. The suitable means to close or seal the inlet or outlet may be valves, check valves, door, shutter or gate. The first housing 60 may be thermally insulated. The first housing 60 comprises at least one means for dispensing a liquid desiccant 66 and optionally means 68 for increasing the contact time and/or contact area between the gas and the liquid desiccant S1. The means 68 for increasing the contact time and contact area between the gas and the liquid desiccant may be arranged prior to the means for dispensing a liquid desiccant 66 in the gas flow direction or it may be arranged adjacent to or in contact with the means for dispensing the liquid desiccant. The liquid desiccant S1 is usually a mixture of recycled or dispensed liquid desiccant from the liquid desiccant container β and the regenerated liquid desiccant S4.

First housing 60 is operatively connected to the liquid desiccant container β allowing the dispensed liquid desiccant to exit the first housing 60 and enter the liquid desiccant container β. As described above the liquid desiccant container β may be a section or part of the first housing 60, desiccant collecting part 46, and/or it may be a separate tank, liquid desiccant storage tank 48.

The device 1 is configured to keep the regenerated liquid desiccant S4 at a temperature at which the desiccant does not precipitate. In one embodiment the tubes or pipes are insulated in order to avoid or minimize precipitation. In another embodiment the liquid desiccant regenerating section γ is located close to the water absorption section α.

The water absorption section α is arranged so that the incoming gas A1 may flow from the first gas inlet 62 through the first housing 60 to and through the first gas outlet 64. The gas should come into contact with the liquid desiccant S1 using the means for dispensing liquid desiccant 66. The means 68 for increasing the contact time and contact area between the gas and the liquid desiccant may be in the form of baffles, particles or beads or a bed of particles or beads. The water or moisture in the gas A1 is absorbed by the water absorption material in the liquid desiccant and the gas A2 exiting through the outlet 64 is dry or at least drier than A1 and has a higher temperature than A1 since the evaporation energy is released heating the gas. In order to avoid that liquid desiccant is carried away by the gas flow stream or as a final drying step a demister 70 may be arranged after the means for dispensing a liquid desiccant 66 and before the first gas outlet 64.

In order to control the gas flow through the housing a fan or a pump 72 may be or is preferably arranged in the first housing 60.

The means for dispensing the liquid desiccant 66 may be any suitable means and is in one preferred embodiment a spraying nozzle. In another preferred embodiment the means for dispensing the liquid desiccant 66 is a cooling pad or evaporator pad. When the means for dispensing the liquid desiccant is a cooling pad or evaporator pad the pad is preferably arranged non-perpendicular to the gas flow. The liquid desiccant is provided at the top of the pad preferably using a distributor of suitable kind. Any suitably cooling pad or evaporator pad may be used such as CeLPad 0760 or CeLPad 0790 from Hutek. An advantage of using a cooling pad or evaporator pad is that the means 68 for increasing the contact time and contact area is not necessary since the pad itself acts as such mean 68 and the pads reduces the amount of liquid desiccant needed and are efficient for water adsorption using a liquid desiccant.

Figure 5B:
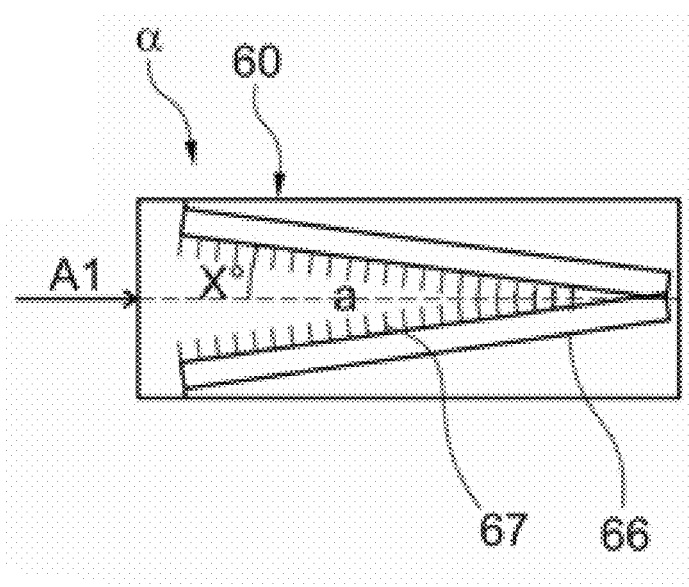
Figure 5C:
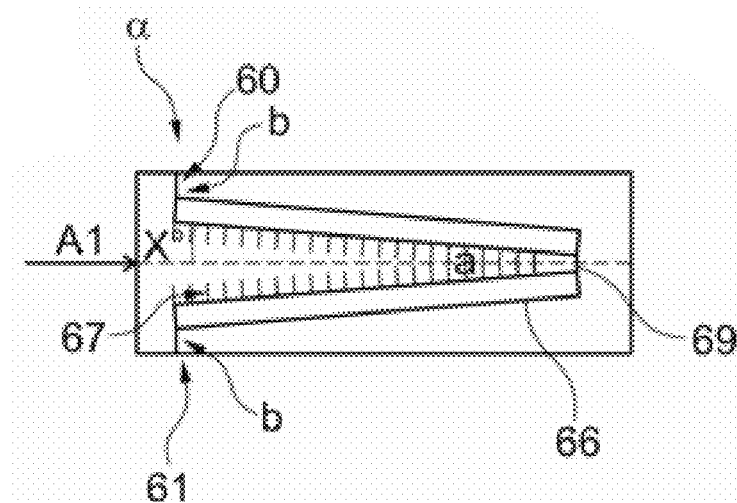
Figure 5D:
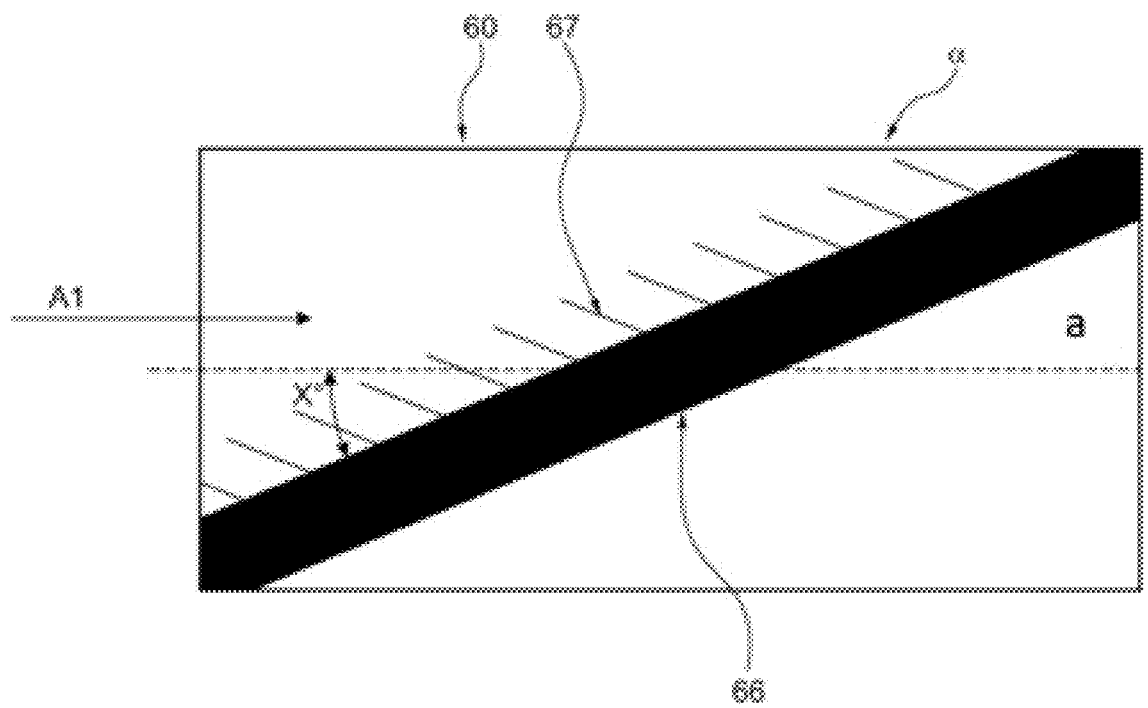

In one preferred embodiment the means for dispensing the liquid desiccant in the first housing 60 is a cooling or evaporator pad or pads 66. These pads provide a large surface to be exposed for the air flow and makes it easy and efficient to distribute the liquid desiccant. The cooling or evaporator pad has a front and a back side where the front side faces the incoming gas. Preferably the pads 66 are arranged at an angle X° with respect to an axis a, said axis a extending essentially in the direction of the gas flow A1. In one embodiment two pads 66 are preferably arranged together in a v formation as shown in FIGS. 5b) and c) with the opening of the v facing the direction of the gas flow. Preferably, the pads 66 are arranged symmetrically about the axis a, so that the opening of the v is two times the angle X°. The angle X° between the pads 66 in the first housing 60 is preferably 10° or more, or 20° or more, or 30° or more but 80° or lower, or 70° or lower, or 60° or lower to the axis a. In one preferred embodiment the angle is 30-40°. This arrangement of the pads in v formation provides a large surface area and good water absorption. FIG. 5d) discloses another embodiment where a single cooling pad is arranged at an angle X° with respect to the axis a and extends across the direction of the gas flow A1 from one side of the first housing 60 to the other side of said housing in order to force the gas to pass through the pad. The angle X° is preferably 10-40° such as 20-30° in order to obtain good absorption and a good air flow.

In order to further control and optimize the gas flow through the pads, protruding elements 67 may be arranged along the pads, preferably at an angle with respect to the pad, said angle not being 90° so that the elements 67 are not perpendicular to the pad i.e. at an angle less than 90° such as 80° or lower. In one preferred embodiment the protruding elements 67 are arranged on back side of the cooling or evaporator pad 66. The protruding elements preferably have a concave shape in the direction of the gas flow to further optimize the flow through the pads. This is schematically illustrated in FIG. 5b). In another preferred embodiment the protruding elements have a convex shape in the direction of the gas flow to further optimize the flow through the pads. In a preferred embodiment the angle X° of the cooling pads or evaporator pads is 30-60° C. and each pad of this embodiment preferably comprises protruding elements 67 which are arranged essentially non-perpendicular to the pads. In FIG. 5c) a preferred embodiment is disclosed where the pads 66 are arranged at an angle X to the axis a and where the proximal ends of the pads or pad 66 in the direction of the gas air flow A1 are separated from the walls of the first housing 60 by a distance b. This distance b is dependent on the size of the first housing but may be in the range of 10-100 cm. By creating a distance b between the pads and the wall of the first housing the incoming air A1 may more easily flow through the pads. The distance b may be created by arranging a separating wall 61 between the wall of the first housing 60 and the pads 66. In one embodiment the distal ends of the pads may also be separated by separating device 69 which may further enhance the flow and reduce the load on the fan or pump 72. In a preferred embodiment the pads 66 extends from a distal end of the first housing 60 to a proximal end of the first housing 66 in order to obtain an optimal surface area and uptake of moisture.

The liquid desiccant may be recirculated until the water absorption material is saturated or has reached the predetermined value of concentration. Prior to being dispensed the liquid desiccant may be cooled using a cooling device 74 operatively connected to the liquid desiccant collecting container β for receiving of liquid desiccant (S1/S1') and optionally also operatively connected to the regenerating section γ for receiving regenerated liquid desiccant S4. The cooling device 74 is also operatively connected to the means for dispensing a liquid desiccant 66 for delivery of cooled liquid desiccant.

New or fresh liquid desiccant is supplied using a liquid desiccant supplying device 76, which may be a storage container and a pump, configured to supply the liquid desiccant. The supplying device 76 may communicate with the control unit 19 in order to monitor the need for new or fresh liquid desiccant. The supplying device 76 may be communicating with the boiler 2. New, fresh, recirculated or regenerated liquid desiccant may be cooled to a desired temperature using the cooling device 74. The cooling device may be, but is not restricted to, a fan and a heat exchanger, a sorption cooling device or a heat pump. By lowering the temperature of the recirculated liquid desiccant, or the regenerated desiccant, the desiccant may obtain a temperature lower than the ambient air. This would make the device an efficient cooling and dehumidifying device.

The device 1 comprises at least one pump 78 configured to facilitate a flow of the liquid desiccant from the water absorption section α, to the liquid desiccant container β, to the boiler 2 and the container 3 and out of the container 3 and to the means for dispensing the liquid desiccant 66. The number of pumps should be as many as necessary to facilitate said flow such as one, two, three, four, five or six or more. In one embodiment the device according to the present invention comprises at least two pumps.

The pumps used in the present invention may be arranged at any suitable position in the device. In one embodiment the pump may be one or more of a centrifugal pump, linear pump, diaphragm pump, piston pump or a rotary vane pump. The selection of pump or pumps is dependent on the wanted pressure. The COP value (Coefficient of Performance) should be as high as possible.

The liquid desiccant may be any solution that may absorb water from a gas or air. The solution contains any suitable absorption material or salt where the absorption material or salt may be LiCl, $CaCl_2$, $CaBr_2$, $LiBr_2$, $MgCl_2$, $NaNO_3$, an alkali acetate (preferably potassium acetate), sulphates or any suitable material known to a person skilled in the art or combinations thereof. In one embodiment the liquid desiccant contains potassium acetate, LiCl, $CaCl_2$ or $MgCl_2$, preferably LiCl or $MgCl_2$ more preferably $MgCl_2$ (magnesium chloride) or more preferably potassium acetate. The advantage of magnesium chloride is that a liquid desiccant containing it absorbs water to a high extent, it has a low reactivity, has a low toxicity, is cheap and it does not increase the boiling temperature of the water in the liquid desiccant significantly. In one embodiment the liquid desiccant contains potassium acetate. The advantage of using alkali acetate such as potassium acetate is that it absorbs water to a high extent but is not corrosive. The absorption material may be in the form of salt, particles or powder. The concentration of the absorption material in the liquid desiccant is preferably near saturated, saturated or over saturated in order to obtain higher absorption. In one embodiment the liquid desiccant is saturated or over saturated with the absorption material.

The present invention facilitates that a much higher salt concentration in the liquid desiccant may be used which in turn allows more moisture to be absorbed. The salt concentration in the liquid desiccant to be dispensed S1 using means 66 is preferably as high as possible in order to absorb as much moisture as possible. In one embodiment the salt concentration is near or at the saturation point or the liquid desiccant is over saturated. In one embodiment the concentration is at least 30 weight % (wt %), or at least 32 weight % or at least 35 weight %. In one preferred embodiment the salt concentration is 30-50 wt % preferably 33-46 wt %. In another preferred embodiment when the salt is or comprises magnesium chloride the concentration is 30 weight %, at least 33 wt %, or at least 34 wt %, or at least 35 wt % such as 33-35 wt % or 34-35 wt %. In another embodiment when the salt is lithium bromide ($LiBr_2$) the concentration is preferably 40-50 wt % more preferably 43-47 weight % even more preferably 45-46 weight %. In another embodiment the concentration of alkali acetate in the liquid desiccant to be dispensed S1 is at least 65 weight %, preferably 67-70 weight %.

The present invention is proven to be very efficient especially in environments with a relative humidity (RH) of 70% or lower, such as 65% or lower, or 60% or lower, or 55% or lower, or 50% or lower.

Figure 9A:
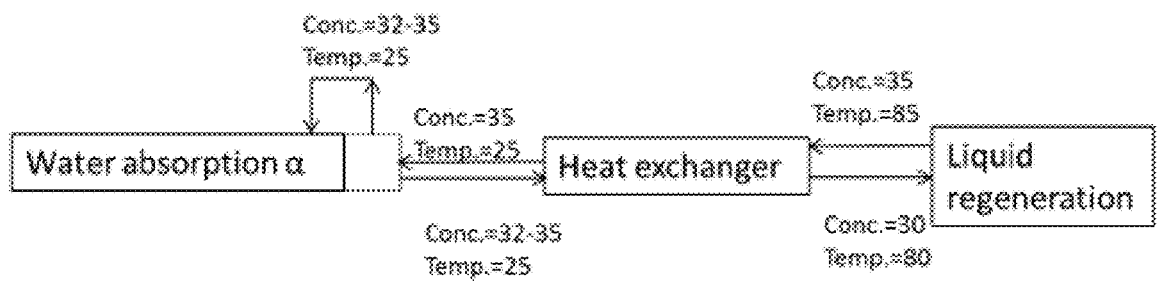
FIG. 9, a) a schematic scheme of the salt concentration and temperature of the liquid desiccant of prior art WO2018/009125, b) a schematic scheme of the salt concentration and temperature of the liquid desiccant according to an embodiment of the present invention wherein the liquid regeneration section $\gamma$ is a heat pump system, and c) a schematic scheme of the salt concentration and temperature of the liquid desiccant according to an embodiment of the present invention wherein the liquid regeneration section $\gamma$ is a vapor compression system.

The advantage of the present invention is illustrated in FIGS. 9a) and b) where a higher concentration in the slurry is possible in comparison with prior art and this is achieved in an energy efficient manner.

An Air Cooler

Figure 6:
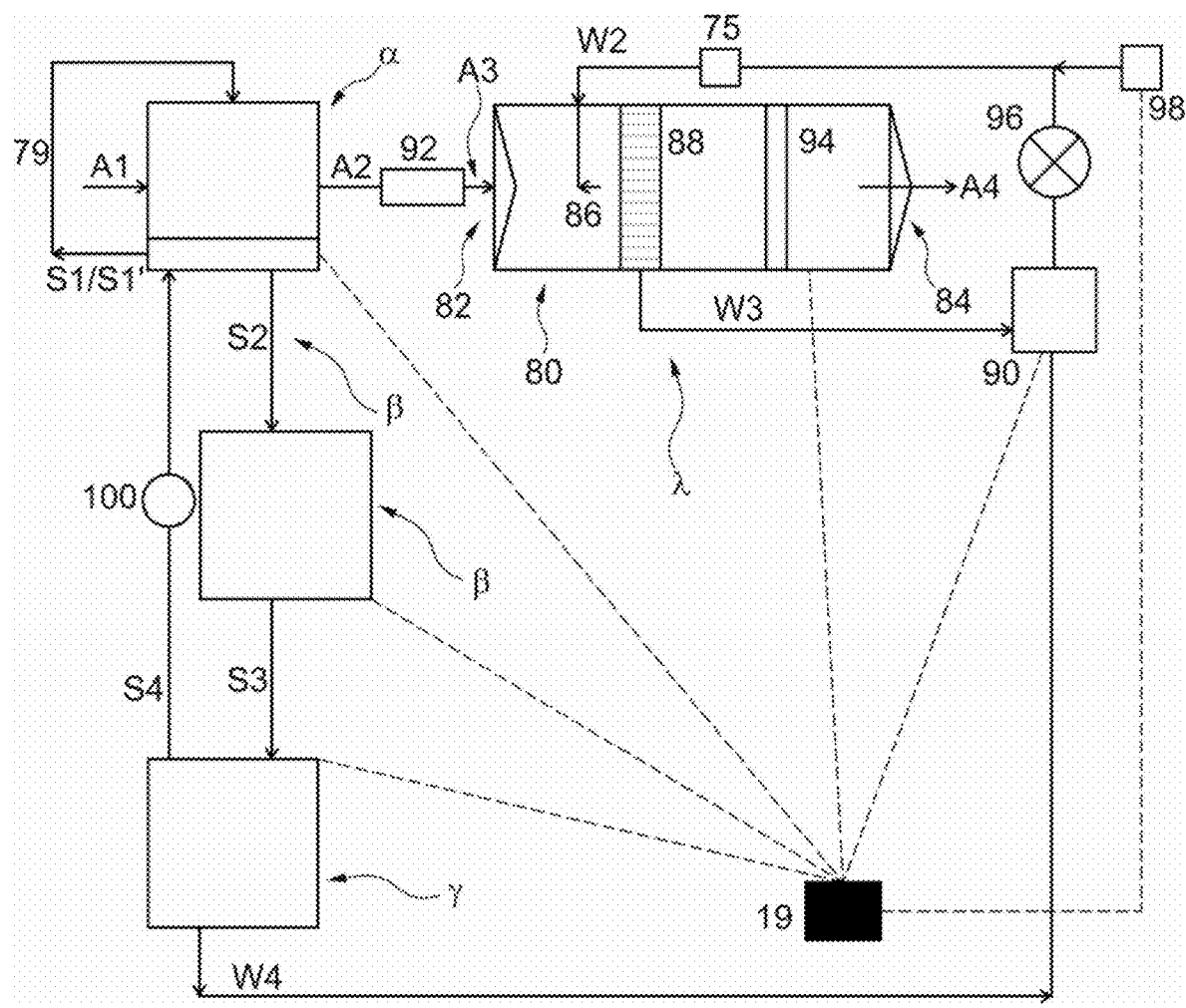
FIG. 6, schematic views of cross-sections of an embodiment of the present invention with the three sections for water absorption ($\alpha$), liquid desiccant container ($\beta$), regenerating liquid desiccant ($\gamma$) and sorption cooling/humidifier ($\lambda$).

Referring now to FIG. 6. The device may be used as an air cooler 79. The air cooler comprises the device for absorbing water from gas 1 and a humidifier λ. The humidifier λ, sorption cooler, comprises a second housing 80 operatively connected to the water absorption section α for receiving air. The second housing 80 has a first inlet 82 operatively connected to the water absorption section α and a first outlet 84, at least one means for dispensing an aqueous solution 86, optionally means 88 for increasing the contact time and contact area between the gas and the aqueous solution W2 (for example water) and which may be arranged prior to or adjacent to the means for dispensing water 86 in the gas flow direction. The first inlet 82 and the first outlet 84 may both be sealable. The means for dispensing water 86 is preferably arranged so that the dispensing of water is done essentially in the direction of the gas flow or in a parallel direction to the gas flow. The means 86 may comprise a mouthpiece or nozzle with openings or outlets in the direction of the gas flow or the means 88 may be cooling pads or evaporator pads. The humidifier or cooling section λ further comprises a water collecting part 90 which is operatively connected to the means for dispensing water and preferably also the water outlet 42. A third heat exchanger 92 may be arranged prior to the first inlet 82 in the direction of the gas flow and the second housing 80 may also comprise a demister 94 arranged after the means for dispensing water and prior to the first outlet 84. The water collecting part 90 may be a separable part from the housing 90 or it may be an inseparable part of the housing 80. The collecting part 90 may be made of the same material as the second housing 90 or it may be made of another material. In one embodiment the water collecting part 90 and the water storage tank 24 are the same.

The air cooler 79 according to the present invention may comprise at least one pump 96 configured to facilitate that the water or aqueous solution is transported from the second housing 80 to the water collecting part 90 and to the means for dispensing water 86. The number of pumps should be as many as necessary to facilitate said transportation. The number of pumps may be one, two, three, four, five or six or more. In one embodiment the device according to the present invention comprises at least two pumps.

The third heat exchanger 92 communicates with the first gas outlet 64 of the first housing so that the gas A2 exiting the first housing through the first gas outlet 64 is cooled in the third heat exchanger 92 to provide a gas A3. The gas A3 is humidified by the aqueous solution W2 and the temperature of the exiting gas A4 is also lower than the gas A3 since the evaporation energy is absorbed cooling the gas. The water collected at the water collecting part 90 may be reused as the aqueous solution W3. A cooling device 75 may be arranged in the humidifier configured to cool the water to be dispensed using the means for dispensing an aqueous solution 86. New or fresh water is supplied using a water supplying device 98 configured to supply water or aqueous solution and communicates with the means for dispensing aqueous solution 86 optionally via the cooling device 60 or the water collecting part 90. The supplying device 98 is preferably communicating with the control unit 19 in order to monitor the quality of the water and the need for new or fresh water. The water supplying device 98 may be a storage container and a pump. A sensor may be arranged in the water collecting part 90 and said sensor may communicate with the control unit 19.

When the water vapor from the gas is absorbed by the desiccant, the vaporization heat is released in the phase transition from vapor to water. The means for dispensing the desiccant 66 and the flow of the desiccant is arranged such that heat of vaporization and water from the gas is transferred away from the first housing 60 by the desiccant, for example by dispensing the liquid desiccant essentially vertically while the gas flow is essentially horizontal. When the gas and the desiccant have the same vapor pressure, the desiccant will not absorb any more water vapor. However, if there is a temperature difference between the two media, heat energy will still be exchanged between the gas and the desiccant. Hence, the temperature and the vapor pressure of the gas or air exiting the first gas outlet 64 might be the same as that of the liquid desiccant before being entering into the first housing 60. Hence, the temperature of the gas might be lower and the humidity content of the gas might be lower than the gas entering the housing. This is even more pronounced when the gas flow through the first and/or the second housing is horizontal.

The dehumidified gas or air entering the humidifier might have the same vapor pressure and temperature as the desiccant, and therefore a low relative humidity. A low relative humidity will allow the gas to be cooled through sorption cooling, i.e. humidification. Sorption cooling, or humidification, of the gas is here made through any means known to a person skilled in the art herein denoted means for dispensing water 86. The water used for the sorption cooling might be but is not restricted to, taken from the water collecting part 90. Since the gas leaving the water absorption or dehumidification section α will have the same or similar temperature as the liquid desiccant and the water used for sorption cooling should preferably have the same or more preferably lower temperature than the gas the water used may be lead through the cooling device 60.

The device 1 or 79 may further comprise regulators in order to control the flow of the liquid desiccant and water, and to regulate the pressure in the pipes. There may also be an expansion tank or a regulator 100 that is operatively connected to the liquid desiccant regeneration system γ and also operatively connected to the water absorption section α. In the expansion tank or a regulator 100 the pressure of the liquid desiccant is regulated preferably to around ambient pressure.

The different parts (first housing, pumps, containers and boiler for example) of the device are connected via suitable tubing. The tubing should preferably be insulated in order to reduce the risk of precipitation in the liquid desiccant, minimize energy losses and to avoid condensation in the tubing. In one embodiment any tubing for liquid desiccant is insulated.

The device 1 and 79 may comprise a control unit 19 configured to optimize the energy and the amount of water extracted from the gas and the properties for regenerating the liquid desiccant. The control unit may control the pressure of the at least one pump 78 and 96, the amount of heat added by the optional heating device 28 to the liquid desiccant in the heating chamber 4. The control unit may also control any restrictor and may monitor the concentrations of the liquid desiccant in the liquid desiccant container β. The control unit 19 may comprise one or more sensors arranged in the device. The control unit preferably comprises a suitable software in order to adjust the settings or properties of the different parts of the device.

The different sections α, β, γ and λ may be arranged in a common housing or separately. Sections α and λ are herein described as different sections but may be just one section where the first gas outlet 64 of the first housing 60 and the first inlet 82 of the second housing 80 are the same.

The Method of Absorbing Water and Cooling Air

The method and the flow of the gas and liquids according to the present invention will now be described with reference to FIGS. 7 and 8. In the following description and figures the denoted gas flows (A1-A4) and liquid desiccants (S1-S4) should only be seen as illustrative and not limiting.

Figure 7:
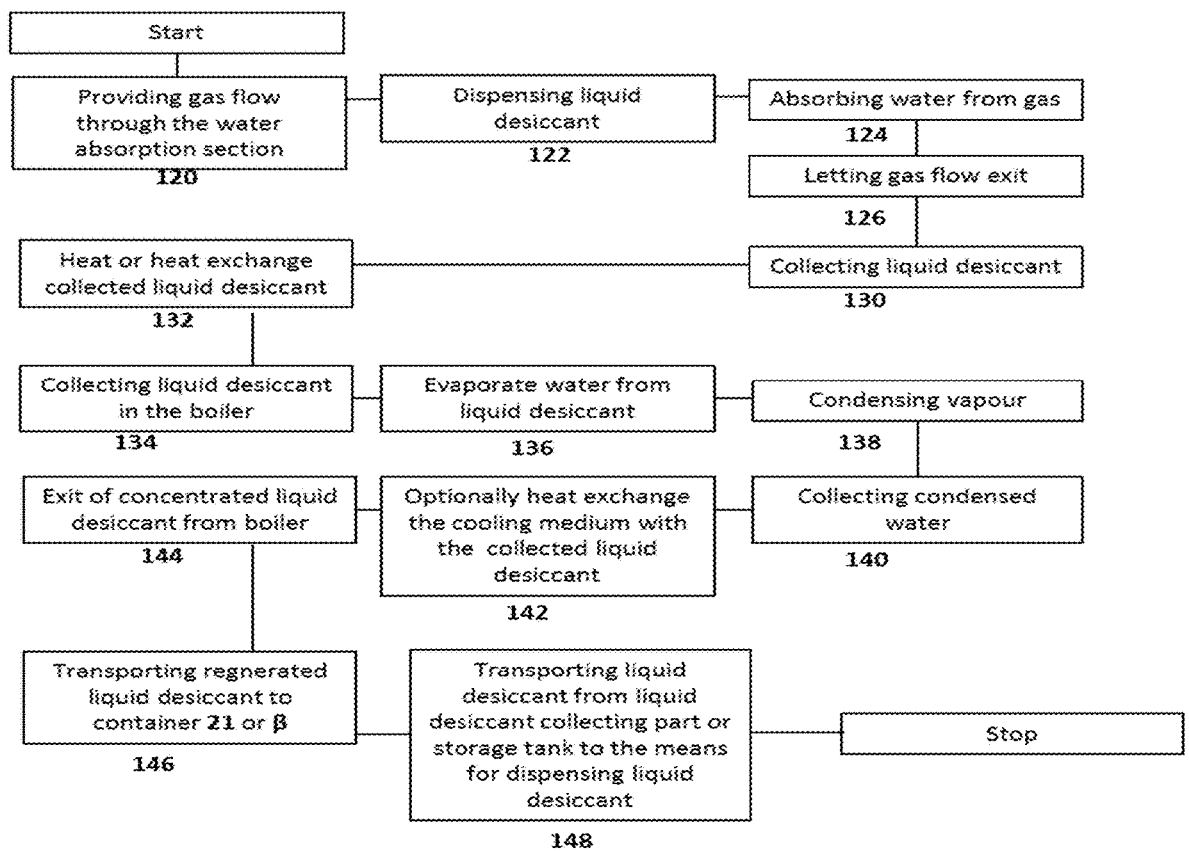
FIG. 7, a schematic scheme of an embodiment of the method of adsorbing water from gas and regenerating a liquid desiccant.

Referring now to FIG. 7. A gas flow A1 is allowed to enter the first housing 120. A liquid desiccant S1 is dispensed 122 and the gas flow A1 is brought into contact with the liquid desiccant and the optional means 68 for increasing the contact time and contact area between the gas and the liquid desiccant. Water or moisture is allowed to be absorbed by the water absorption material in the liquid desiccant 124. The liquid desiccant that has been brought into contact with the gas flow S2 is then collected 126 and the gas flow A2 is allowed to exit the first housing 60 128. The liquid desiccant S2 is allowed to exit the first housing and collected 130 in the liquid desiccant container β and optionally heated 132 using heater 50. The heated liquid desiccant S3 exiting the liquid desiccant container β is collected in the boiler 2 134.

Water is evaporated from the collected liquid desiccant 136 using the heat pump system 8 and the evaporated water is condensed 138 forming condensed water which is collected 140. The cooling media or refrigerant in the heat pump system may be heat exchanged 142 with the liquid desiccant in the liquid desiccant container β. A concentrated liquid desiccant S4 is allowed to exit 144 the boiler 2 and is returned 146 to the liquid desiccant container β or the water absorption section α. Liquid desiccant in the liquid desiccant container β may then be transported to the means for dispensing the liquid desiccant 148.

Figure 8:
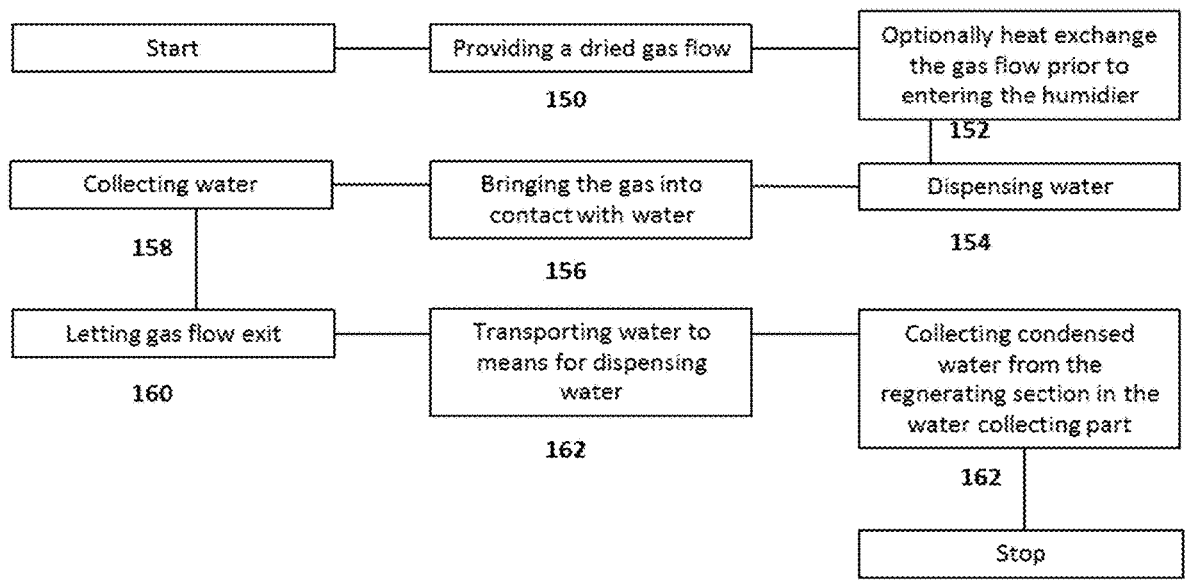
FIG. 8, a schematic scheme of an embodiment of the method of humidifying and cooling air.

When the device is used to produce humidified cool gas or air the method further comprises the steps illustrated in FIG. 8. The dried gas A2 exiting the first housing 60 is provided 150 and may then be heat exchanged 152 forming a cooled gas A3. In one embodiment the media used in the heat exchanger is the surrounding air or gas such as A1. In one embodiment the aqueous solution is cooled prior to being dispensed using a cooling device 75. An aqueous solution or water W2 is dispensed 154 and the gas flow A3 is brought into contact with the aqueous solution and the optional means 88 for increasing the contact time and contact area between the gas and the aqueous solution or water 156. The aqueous solution that has been in contact with the gas flow is then collected 158 in the water collecting part 90. The gas is humidified when brought into contact with the dispensed solution and the evaporation energy is absorbed cooling the gas and the cooled humidified gas A4 exits 160 the second housing. The collected water in the water collecting part 90 is allowed to be transported 162 to the means for dispensing water 86. Optionally the water W4 generated in the liquid desiccant regeneration process and collected in step 140 may be returned 162 to the water collecting part 90.

A preferred embodiment of a method for controlling a device for absorbing water will now be described in more detail.

During operation of the device 1, concentration of liquid desiccant is detected, either at suitable intervals or continuously. The detection can take place in the liquid desiccant container β or in any conduit that conveys liquid desiccant to and from the water absorption section α as well as in the water absorption section α itself. Preferably, a first sensor is arranged inside the liquid desiccant storage tank 48, at an inlet or outlet of the liquid desiccant storage tank 48 or in the liquid desiccant collecting part 46 or inside a pipe, tube or other conduit that transports liquid desiccant in the device 1. The first sensor is preferably configured to determine the water content in the desiccant, as also described above, or to determine the concentration directly or by measuring the conductivity and temperature, and can communicate measurement values to the control unit 19 where the concentration can be determined and monitored as mentioned above. Preferably measurements, calculations or determinations conducted by the control unit 19 is based on what absorption material or salt is used in the liquid desiccant.

When using the term concentration of liquid desiccant herein, this is to be understood as a concentration of an absorption material or salt in the liquid desiccant. In some embodiments the salt is magnesium chloride ($MgCl_2$) but in other embodiments the salt could instead be potassium chloride (KCl), an alkali acetate or lithium bromide (LiBr) or any other suitable salt. The water content or the concentration of salt is determined and compared to the predetermined value which depends on the salt used and the environment in which the device 1 is operating. Dependent on the temperature and humidity of the environment and the gas to be dehumidified the predetermined value varies. In order to absorb moisture from a gas having a relative humidity (RH) of 50% or lower the concentration of the salt in the liquid desiccant to be dispensed is required to be close to saturation. For some salts such as magnesium chloride this would mean a concentration of preferably at least 30%, or at least 31%, or at least 32%, or at least 33%, or at least 34%, or at least 35%. A preferred range is 34-36 weight %. When using potassium acetate the concentration is preferably at least 65 weight %, more preferably at least 67 weight %, preferably at least 69 weight %. A preferred range is 67-70 weight %.

When the detected concentration of the collected liquid desiccant S2 is determined to be at or below the predetermined value, a selected quantity of liquid desiccant is transported to the liquid desiccant regenerating section γ as described in detail above. The quantity of liquid desiccant is preferably less than 0.25 of a total amount (weight) of liquid desiccant in the device 1, preferably less than 0.1 of the total amount and more preferably less than 0.05 but preferably more than 0.001 of the total amount. Thereby, the device 1 can continue operation absorbing water using remaining liquid desiccant.

Preferably, after the selected quantity of liquid desiccant has been removed for regeneration the concentration is measured again after an interval or continuously, and as long as the concentration is determined to be at or below the predetermined value another quantity is selected and transported to the regenerating section γ for regeneration. The selected quantity can remain fixed during operation of the device 1 or can vary depending on the total amount of liquid desiccant in the system or on how much the detected concentration differs from the predetermined value, where a large difference would indicate that a larger quantity should be selected for regeneration whereas a small difference would instead indicate that only a smaller quantity needs to be regenerated in order to maintain the concentration at a desired value or in a desired interval.

The liquid desiccant S3 that is transported for regeneration is at a first temperature T1, that can be determined by a temperature sensor or similar means for measuring temperature and that can be arranged inside a tube, pipe or conduit that transports the liquid desiccant S3 to the liquid desiccant regeneration section γ, inside an inlet or outlet of such a tube, pipe or conduit, or alternatively in the same or similar location where the first sensor is placed. Alternatively, the temperature sensor can be identical with the first sensor and be configured to detect both concentration and temperature.

Inside the liquid desiccant regeneration section γ, the liquid desiccant is regenerated as described in detail above. The regeneration is performed at the second temperature T2 which is the boiling temperature of the liquid desiccant, and at a first pressure. By adjusting the first pressure, the boiling temperature can be correspondingly altered as is well known within the art. As non-limiting examples the concentration of the absorbing material or water absorbing material such as magnesium chloride of the liquid desiccant increases from around 30-33 weight % to around 34-36 weight % during the regeneration, and for alkali acetate such as potassium acetate the concentration increases from 60-65 weight % to 66-70 weight % during the regeneration. The regeneration takes place until the liquid desiccant reaches the desired concentration that may be preset or may be determined by the device 1 or control unit 19 of the device depending on parameters such as ambient temperature, ambient humidity, or parameters of the device 1 such as a total amount of liquid desiccant in the water absorption section and/or the liquid desiccant container. The desired concentration of the regenerated liquid desiccant may advantageously be the optimal concentration, i.e. the concentration that makes the concentration of the liquid desiccant obtained after mixing the regenerated liquid desiccant and the liquid desiccant in the liquid desiccant container β at least reach the predetermined value of concentration where regeneration is to take place so that no further regeneration is needed. In one embodiment the desired concentration may advantageously be the concentration at which an optimal ΔC is obtained. In some applications, regeneration may be set to take place when the predetermined value is reached and the optimal concentration should then be a concentration that brings the concentration of the total amount of liquid desiccant in the liquid desiccant container above the predetermined concentration. In other applications, regeneration may be set to take place when the concentration is below the predetermined concentration, making the optimal concentration that which brings the concentration of the total amount of liquid desiccant in the liquid desiccant container to the predetermined amount or above.

After regeneration, the regenerated liquid desiccant S4 is transported to be used again for absorbing water, either by insertion of the regenerated liquid desiccant S4 into the water absorption section α or by insertion into the liquid desiccant container β. In some embodiments, the regenerated liquid desiccant S4 is used directly for absorbing water but in most embodiments it will first be mixed with liquid desiccant that is already in the water absorption section α or the liquid desiccant container β preferably with the liquid desiccant in the liquid desiccant collecting part 46. The regenerated liquid desiccant S4 exiting the liquid desiccant regenerating section γ has a third temperature T3.

The regeneration takes place using a first energy amount that is required to set and maintain the pressure inside the liquid desiccant regenerating section. This energy is needed to operate the vacuum system that is configured to adjust the pressure. In order for the regeneration to be performed in an energy efficient way, a maximum energy is determined or preset and the first pressure P1 is selected in such a way that the first energy amount is less than or equal to the maximum energy. The regeneration takes place until the liquid desiccant is at the desired concentration and/or a difference between the third temperature (T3) and the first temperature (T1) is minimized. Advantageously, the regeneration is performed in such a way that the desired concentration is achieved with a minimum of increase in temperature while still requiring less than or equal to the maximum energy.

It is thus advantageous to keep the third temperature T3 as low as possible so that the difference between the third temperature T3 and the first temperature T1 is minimized. Thereby, the efficiency of the water absorption can be increased and the need for further cooling of the regenerated liquid desiccant S4 can also be decreased, thus also saving energy. Since the third temperature T3 is reached starting from the first temperature T1 and raising the first temperature T1 to the boiling temperature for the liquid desiccant, the third temperature T3 can be minimized by decreasing the boiling temperature of the liquid desiccant in the regenerating section γ. This is achieved by selecting the first pressure P1 so that the boiling temperature is lowered. The control unit 19 is preferably arranged to use the first temperature T1 to determine a suitable first pressure P1 in order to keep the second temperature T2 close to the first temperature but at the same time avoiding lowering the pressure too much requiring excessive energy consumption. In the preferred embodiment, the first pressure P1 is selected so that the energy required to lower the pressure is balanced against the energy that would be required to cool the regenerated liquid desiccant S4 from the third temperature T3 to the first temperature T1. In this preferred embodiment, the first pressure P1 is therefore selected as the lowest pressure that still require less energy than the cooling of the regenerated liquid desiccant S4.

Generally, the third temperature T3 will be the same as the second temperature T2 or at least very close to the second temperature T2, if no significant heating of the liquid desiccant takes place after regeneration. It is also advantageous to avoid heating of the liquid desiccant after regeneration, since this aids in keeping the difference between the third temperature T3 and the first temperature T1 to a minimum. If the regenerated liquid desiccant is heat exchanged with liquid desiccant to be regenerated the third temperature T3 will be lower than the second temperature T2. However it is preferred that T3 is high enough in order to avoid precipitation in the heat exchanger.

Thus, preferably the first temperature T1 is used to select the first pressure P1 so that the boiling temperature is as close to the first temperature T1 as possible, while still keeping the energy required to create the first pressure P1 below an energy threshold that is predetermined or that can be adjusted depending on the energy required to cool the regenerated liquid desiccant, or alternatively adjusted depending on available energy or on any other factor deemed suitable.

Thus, by determining the concentration of liquid desiccant before regeneration and by selecting a desired concentration after regeneration, the energy requirements for performing the regeneration at different boiling temperatures can also be determined. Then, a boiling temperature is selected that is as low as possible while also requiring energy below that maximum energy value so that the temperature difference is minimized in an energy efficient and thereby cost efficient way. Depending on the concentration of the liquid desiccant before regeneration and the desired concentration after regeneration, as well as other factors such as the temperature before regeneration the energy requirements may differ as will be readily apparent to the skilled person.

The desired concentration of liquid desiccant can be selected or predetermined, or can alternatively be determined based on an ambient temperature, an ambient humidity and/or other factors such as a total amount of liquid desiccant. In applications where the ambient temperature and ambient humidity are both high, a lower desired concentration can be used whereas a low ambient temperature and a low ambient humidity would require a higher desired concentration in order for the device to operate efficiently to absorb water. In some applications, at least one parameter such as an ambient temperature, ambient humidity or other factors can be determined during operation and the desired concentration also adjusted during operation to allow for an efficient operation even where temperature, humidity and/or other factors change over time. However, in many applications the desired concentration can be predetermined an preset in order to achieve a cost efficient device with fewer sensors and other components.

In some embodiments, it can still be needed to cool the regenerated liquid desiccant S4 from the third temperature T3 to the first temperature T1 or at least to a temperature lower than the third temperature T3. This need can also be determined by the control unit 19 depending on the third temperature T3 or other factors. In some embodiments, it is desirable to cool the regenerated liquid desiccant S4 further, preferably to an ambient temperature or even lower since this increases the water absorption efficiency.

During transport of the liquid desiccant S3 to the liquid desiccant regenerating section γ and of regenerated liquid desiccant S4 back to the water absorption section α or the liquid desiccant container β, it is advantageous to avoid or at least to minimize precipitation of the salt in the liquid desiccant. This is achieved by transporting the liquid desiccant at a pressure that is above a second pressure P2 and/or at a temperature that is above a fourth temperature T4. In one preferred embodiment T4 is the same as T3.

In one embodiment, the first temperature T1 is 25° C. and the first pressure P1 is selected as 50 mbar. This will result in a second temperature T2 that is also the boiling temperature of the liquid desiccant that is in the range of 40–45° C. When additional heating of the liquid desiccant after regeneration is avoided, the resulting third temperature T3 is essentially the same as the second temperature T2, i.e. no additional heating is performed that would alter the temperature significantly. In this embodiment, the device may be located in a place having an ambient temperature of about 20° C. or about 30° C., and the salt used in the liquid desiccant is $MgCl_2$. The difference in temperature between the liquid desiccant before regeneration and the liquid desiccant after regeneration is about 15-20° C. but in many embodiments smaller differences can be achieved, especially when a lower pressure is selected as the first pressure P1. A lower concentration of salt might be used in environments with high humidity.

As described above, heat may advantageously be transferred from the liquid desiccant after regeneration to the liquid desiccant that is about to be regenerated, so that the increase in temperature during regeneration can further be minimized. In such embodiments, the difference in temperature can be kept very small while at the same time allowing for a higher first pressure P1 that can be achieved using less energy. The concentration of liquid desiccant selected as the predetermined value varies depending on each application of the present invention, but some important factors for selecting the concentration are an ambient humidity and flow in the device. For a higher ambient humidity a lower concentration such as about 30% (when using magnesium chloride or lithium chloride for example) can be selected while a higher concentration such as about 33%, 34% or even 35% may be required when the ambient temperature and ambient humidity is lower. When using alkali acetate such as potassium acetate the corresponding concentrations are 60-65 weigh % at high ambient humidity and 67-70 weigh % at low ambient humidity. For a high flow in the device, a higher concentration may be preferred while at a lower flow a lower concentration can be selected. The concentrations given here are for an embodiment where $MgCl_2$ is used in the liquid desiccant, and for other salts the selected concentrations will vary as readily understood by the skilled person. However, the general principle of selecting the concentration depending on the flow and the ambient humidity is the same regardless of the substance used as liquid desiccant.

Although embodiments of the invention described above comprise a local control unit and a control unit 19, and processes performed in at least one processor in that control unit 19 or alternatively a separate processor unit, the invention also extends to computer programs, particularly computer programs on or in a carrier, adapted for putting the invention into practice. The programs may be in the form of source code, object code, a code intermediate source and object code such as in partially compiled form, comprise software or firmware, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

In one or more embodiments, there may be provided a computer program loadable into a memory communicatively connected or coupled to at least one data processor, e.g. the control unit 19, comprising software or hardware for executing the method according any of the embodiments herein when the program is run on the at least one data processor.

In one or more further embodiment, there may be provided a processor-readable medium, having a program recorded thereon, where the program is to make at least one data processor, e.g. the control unit 19, execute the method according to of any of the embodiments herein when the program is loaded into the at least one data processor.

It is to be noted that features of the various embodiments described herein may freely be combined unless such a combination is expressly stated as unsuitable.

EXAMPLES

Example 1

If the temperature of the desiccant entering the heat exchanger is about 20° C. the maximum allowed concentration of magnesium chloride is about 35% to avoid formation of salt crystals in the heat exchanger since the warm desiccant will be cold. Since water is removed from the desiccant in the evaporation process, the concentration of the desiccant entering the heat exchanger and the evaporation process needs to be lower than 35%.

If a certain water production capacity is desired, $\dot{m}$, then flow, Q, through the heat exchanger and the evaporator depends on the difference in concentration, $\Delta C$, before and after the evaporation process according to $$Q=\dot{m}/\Delta C$$

Figure 9B:
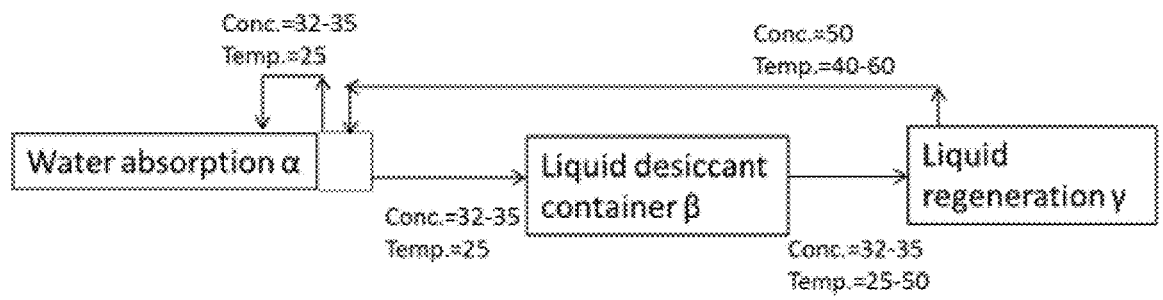
Figure 9C:
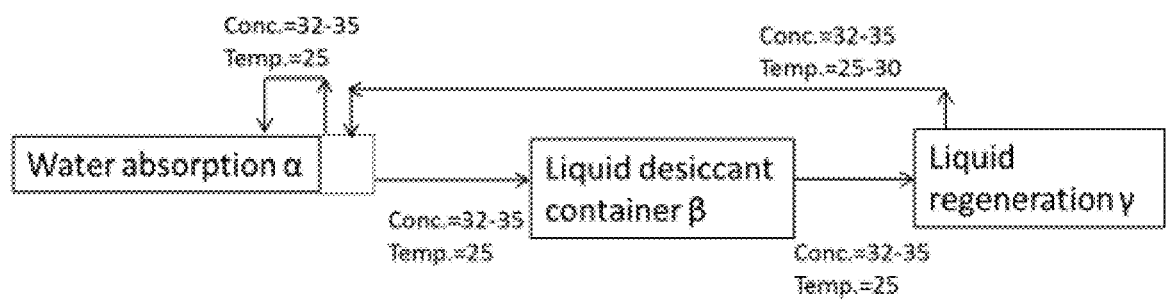

Since there are no perfect heat exchangers with 100% efficiency the higher the flow, Q, the more energy is needed to heat the liquid desiccant to the boiling point. The power, P, needed to heat the desiccant to the boiling point can be expressed as $$P=C_vQ(T_b-T_a)(1-\mu)$$

where Q is the flow through the desiccant, $T_b$ is the boiling temperature, $T_a$ is the temperature on the desiccant in the water absorber, and $\mu$ is the efficiency on the heat exchanger. From the equation, it can be seen than is desirable to minimize the flow and maximize the efficiency $\mu$. This is schematically illustrated in FIG. 9b.

As an example, if $\Delta C$ is 5. An efficient evaporation process might be possible using mechanical vapor recompression. However, the concentration during water absorption can not exceed 30% which corresponds to an equilibrium relative humidity of about 50%. The impact of this is that in a water absorption process the air can only be dried to 50% in relative humidity. If the air is drier than 50% in relative humidity, it is not possible to absorb water vapor from the air. Moreover, the if a fan is used to the process the energy requirement to absorb 1 kg of water vapor from the air depends on the relative humidity in the air to be treated. If the air to be treated, the process air, is for example 51%, the fan needs to treat a large air volume to absorb 1 kg of water. If the process air is 90%, the air volume to be treated is less.

Example 2

A device according to the present invention was used to absorb water from air. As liquid desiccant magnesium chloride was used and cooling pads was used to distribute the liquid desiccant. A fan was arranged to transport air through the water absorption section and the air had a relative humidity of 58%.

The experiment showed that the relative humidity of the air after absorption was 43%.

Example 3

A commercially available boiler using a heat pump was used to study how the concentration of the liquid desiccant affects the energy consumption (kWh) when evaporating 1 liter of water. Magnesium chloride was used as the absorbing material in the liquid desiccant and the pressure when measuring the boiling point was 1 bar. The boiling point for the liquid desiccant increases with increasing concentration as seen in the table below.

| Concentration (wt %) | 23.7 | 29.9 | 33.8 | 37.5 |
|---|---|---|---|---|
| Boiling temperature (° C.) | 107.8 | 113.2 | 116.2 | 121 |

Figure 10A:
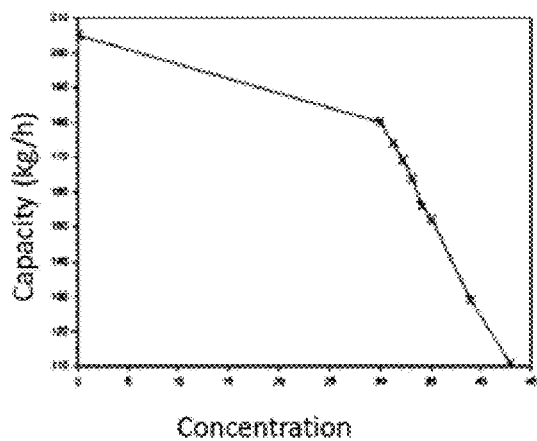
FIG. 10, graphs disclosing a) capacity as a function of concentration and b) COP as function of concentration when regenerating a liquid desiccant with $MgCl_2$ in a boiler in accordance with the present invention.
Figure 10B:
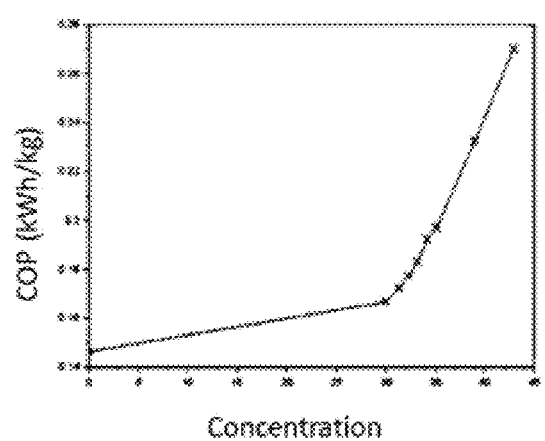

As can be seen in FIG. 10 the energy required to increase the concentration increases drastically. Therefore the regeneration step should preferably result in a sufficient concentration, i.e. a concentration sufficient to efficiently absorb water or moisture. A higher concentration would require unnecessary energy and thereby a higher cost.

The invention claimed is:

1. A device for absorbing water comprising:
at least one water absorption section for absorbing water from a gas flow using a liquid desiccant, wherein the water absorption section is operatively connected to at least one liquid desiccant container for delivery of liquid desiccant to and from the water absorption section, wherein the at least one liquid desiccant container is further operatively connected to a liquid desiccant regenerating section for delivery of liquid desiccant to and from the at least one liquid desiccant container, and wherein the liquid desiccant regenerating section comprises at least one boiler comprising a container
a vacuum system operatively connected to the boiler for reducing the pressure in the container and wherein the regenerating section further comprises a heating unit operatively connected to the container configured to heat the liquid desiccant in the container, and
wherein the device further comprises a control unit configured to obtain or determine a concentration value of liquid desiccant and to be operatively connected to the vacuum system for controlling the vacuum system to reduce the pressure in the container to a first pressure during regeneration of liquid desiccant; wherein the control unit also communicates with the liquid desiccant container to determine or detect or measure temperature and concentration of collected liquid desiccant in the liquid desiccant container; and also temperature and humidity of a surrounding atmosphere and wherein the control unit is configured to set a predetermined or threshold concentration value at which regeneration of the liquid desiccant should be performed or when, and what quantity, of liquid desiccant in the liquid desiccant container should be transported to the liquid desiccant regeneration section based on an ambient temperature and relative humidity and the concentration of a collected dispensed liquid desiccant in the liquid desiccant container.

2. The device according to claim 1 wherein the control unit also communicates with the water absorption section to determine or detect or measure a concentration of the liquid desiccant to be dispensed.

3. The device according to claim 1, wherein the control unit is further configured to determine an energy amount required for regeneration of the liquid desiccant based at least on the concentration of liquid desiccant to be regenerated or the concentration of the collected liquid desiccant in the liquid desiccant container and a predetermined desired concentration of the regenerated liquid desiccant, and wherein the control unit is further configured to select the first pressure so that the energy amount for operating the vacuum system to achieve and maintain the first pressure is less than or equal to a predetermined maximum energy.

4. The device according to claim 1 wherein the control unit is further configured to determine or predetermine a desired concentration of a regenerated liquid desiccant based on at least one of the ambient temperature and an ambient humidity and/or wherein the control unit is further configured to determine or predetermine a threshold value of the collected dispensed liquid desiccant in the liquid desiccant container.

5. The device according to claim 1 wherein the control unit is configured to select the first pressure to lower the boiling point of the liquid desiccant and to minimize a temperature difference between a third temperature of a regenerated liquid desiccant and a first temperature of the liquid desiccant to be regenerated.

6. The device according to claim 1 wherein the heating unit is a vapor compression system comprising a compressor, a first desiccant heat exchanger, a second desiccant heat exchanger and a regulator;
wherein the first desiccant heat exchanger is operatively connected to the at least one liquid desiccant container for delivery and receiving of liquid desiccant and further operatively connected to the container for delivery and receiving of liquid desiccant;
wherein the container is operatively connected to the regulator for delivery of liquid desiccant to the regulator and where the regulator is further operatively connected to the second desiccant heat exchanger for delivery of liquid desiccant;
wherein the second desiccant heat exchanger is further operatively connected to the container for delivery of liquid desiccant; and
wherein the container is also operatively connected to the compressor for delivery of vapor formed in the container to the compressor and wherein the compressor is further operatively connected to the second desiccant heat exchanger for delivery of compressed vapor.

7. The device according to claim 1 wherein the liquid desiccant regenerating section comprises
the at least one boiler comprising a container having a heating chamber and a condensing chamber, wherein the heating chamber is connected to the condensing chamber allowing vapor formed in the heating chamber to enter the condensing chamber,
the vacuum system operatively connected to the boiler for reducing the pressure in the container, and
wherein the heating unit is a heat pump system, wherein the heat pump system has a first heat exchanger arranged in the heating chamber in thermal contact with the liquid desiccant in the heating chamber, a second heat exchanger arranged in the condensing chamber in thermal contact with vapor in the condensing chamber, wherein the first heat exchanger is further connected to a cooling device, wherein the cooling device is also connected to the second heat exchanger and wherein the second heat exchanger is connected to a compressor, said compressor also being connected to the first heat exchanger.

8. The device according to claim 7 wherein the liquid desiccant container comprises a heater wherein said heater is a heat exchanger in which the liquid desiccant in the liquid desiccant container is heat exchanged with a cooling media of the heat pump.

9. The device according to claim 1 wherein the device comprises two or more of the water absorption sections per each liquid desiccant regenerating section.

10. The device according to claim 1 wherein the device comprises two or more of the water absorption sections per each liquid desiccant container.

11. The device according to claim 1 wherein the water absorption section comprises at least one means for dispensing the liquid desiccant and wherein said means is a cooling pad or evaporator pad or pads, and wherein the water absorption section further preferably comprises a fan or a pump in order to provide a gas flow through the first housing.

12. The device according to claim 1 wherein the water absorption section, the liquid desiccant container and the liquid desiccant regenerating section are connected via insulated tubing.

13. The device according to claim 11 wherein the cooling pad or evaporator pad is arranged at an angle with respect to an axis extending in the direction of the gas flow and wherein the pad extends across the direction of the gas flow from one side of the first housing and wherein the pad comprises protruding elements which are arranged non-perpendicular to the cooling or evaporator pads.

14. The device according to claim 1 wherein the liquid desiccant is an aqueous solution of magnesium chloride ($MgCl_2$) or an alkali acetate.

15. The device according to claim 14 wherein the concentration of magnesium chloride in the liquid desiccant to be dispensed using the means for dispensing a liquid desiccant is at least 30 weight %, or wherein the concentration of alkali acetate in the liquid desiccant to be dispensed using the means for dispensing a liquid desiccant is at least 65 weight %.

* * * * *